US012601815B2

(12) United States Patent
Pomerantz

(10) Patent No.: US 12,601,815 B2
(45) Date of Patent: Apr. 14, 2026

(54) OSCILLATOR ASSEMBLY WITH COUNTER-ROTATING MASS

(71) Applicant: Innoviz Technologies Ltd., Rosh Haayin (IL)

(72) Inventor: Uri Pomerantz, Tel Aviv (IL)

(73) Assignee: Innoviz Technologies Ltd., Rosh HaAyin (IL)

( * ) Notice: Subject to any disclaimer, the term of this patent is extended or adjusted under 35 U.S.C. 154(b) by 840 days.

(21) Appl. No.: 17/974,758

(22) Filed: Oct. 27, 2022

(65) Prior Publication Data

US 2024/0142580 A1      May 2, 2024

(51) Int. Cl.
| | |
|---|---|
| *G01S 7/481* | (2006.01) |
| *H02K 1/12* | (2006.01) |
| *H02K 1/27* | (2022.01) |
| *H02K 7/06* | (2006.01) |

(52) U.S. Cl.
CPC .............. *G01S 7/4817* (2013.01); *H02K 1/12* (2013.01); *H02K 1/27* (2013.01); *H02K 7/06* (2013.01)

(58) Field of Classification Search
CPC ............ H02K 7/02; H02K 7/06; F16F 15/145
See application file for complete search history.

(56) References Cited

U.S. PATENT DOCUMENTS

| | | | |
|---|---|---|---|
| 6,856,437 | B2 | 2/2005 | Witt et al. |
| 9,063,549 | B1 | 6/2015 | Pennecot et al. |

| | | | | |
|---|---|---|---|---|
| 10,479,018 | B2 | 11/2019 | Brown et al. | |
| 2015/0192603 | A1* | 7/2015 | Baldasarre | ............ G01P 15/125 |
| | | | | 73/514.32 |
| 2016/0182892 | A1 | 6/2016 | Ko et al. | |
| 2020/0355803 | A1 | 11/2020 | Gao et al. | |
| 2023/0006531 | A1 | 1/2023 | Pomerantz et al. | |

FOREIGN PATENT DOCUMENTS

WO      WO-2022/219410 A2      10/2022

OTHER PUBLICATIONS

LaunchPoint TechBlog; "Magnetic Spring Technology Enables High-Speed Rotary and Linear Actuators," retrieved online <https://web.archive.org/web/20180712014435/https:/www.launchpnt.com/techblog/bid/63869/Magnetic-Spring-Technology-Enables-High-Speed-Rotary-and-Linear-Actuators>: 4 pages (May 10, 2011).

(Continued)

*Primary Examiner* — Thanh Luu
(74) *Attorney, Agent, or Firm* — Meitar Patents Ltd.; Daniel Kligler

(57)      ABSTRACT

Provided herein are an oscillator assembly including a stator, a rotor and at least one rotor magnet disposed on the rotor. The rotor magnet configured to move with the rotor between a first terminal point and a second terminal point. The assembly includes a counter-rotating mass (CRM) rotatably and elastically mounted on the stator, wherein the rotor is rotatably mounted on the CRM. The CRM including a first energy conversion element (ECE) disposed on the CRM, wherein the first ECE is configured to transfer torque from the rotor to the CRM, thereby causing rotation of the CRM and at least a second ECE disposed on the CRM, wherein the second ECE is configured to transfer torque from the rotor to the CRM, thereby causing rotation of the CRM.

42 Claims, 7 Drawing Sheets

(56)          References Cited

OTHER PUBLICATIONS

Mrak et al., "Optimal Magnetic Spring for Compliant Actuation—Validated Torque Density Benchmark," Actuators, 8:18 (2019).
International Search Report and Written Opinion for Application No. PCT/IB23/00648 dated Mar. 11, 2024.
International Search Report and Written Opinion for International Application No. PCT/IB2022/000220 dated Dec. 20, 2022.
Invitation to Pay Additional Fees for International Application No. PCT/IB2022/000220 dated Oct. 5, 2022.

* cited by examiner

204

120

216

208

212

124

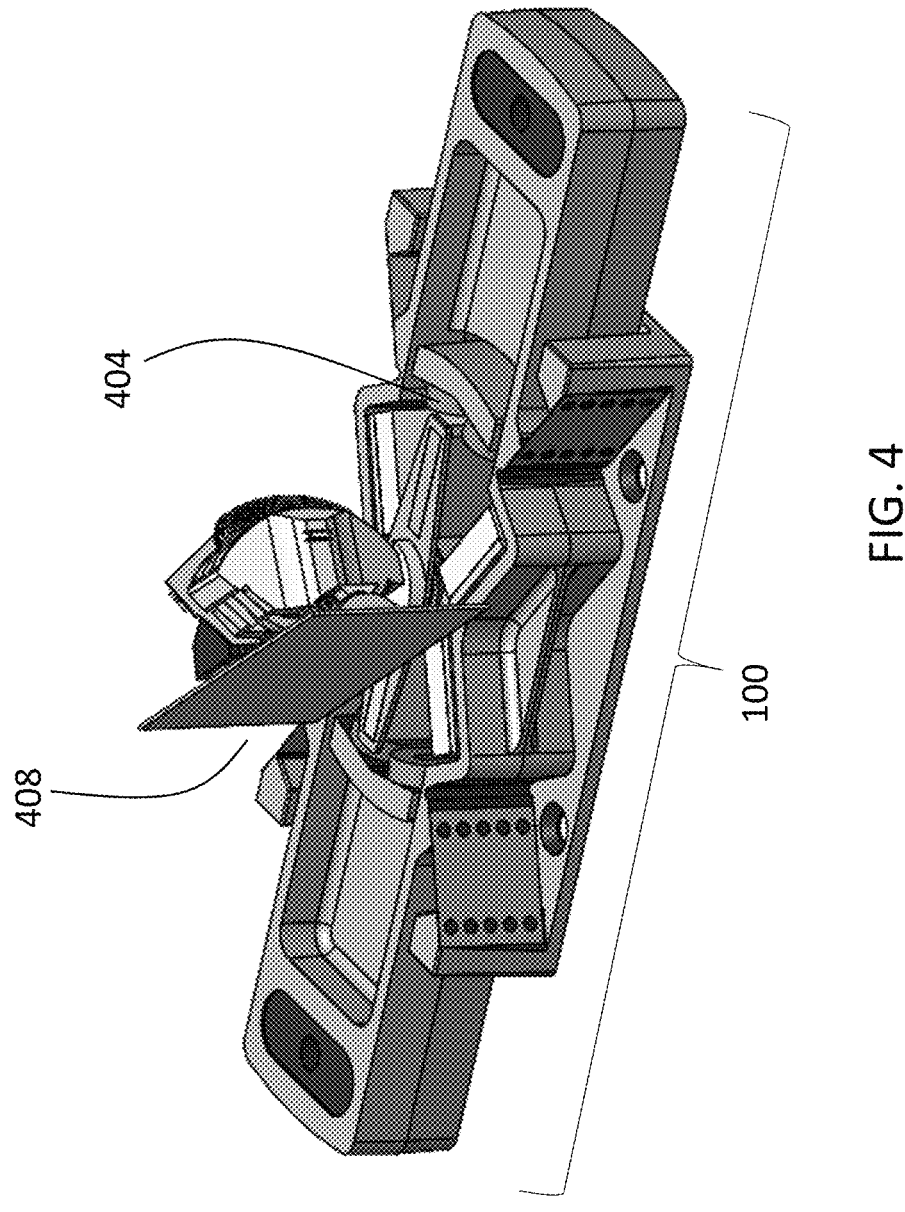
404
408
100
FIG. 4
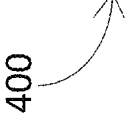
400

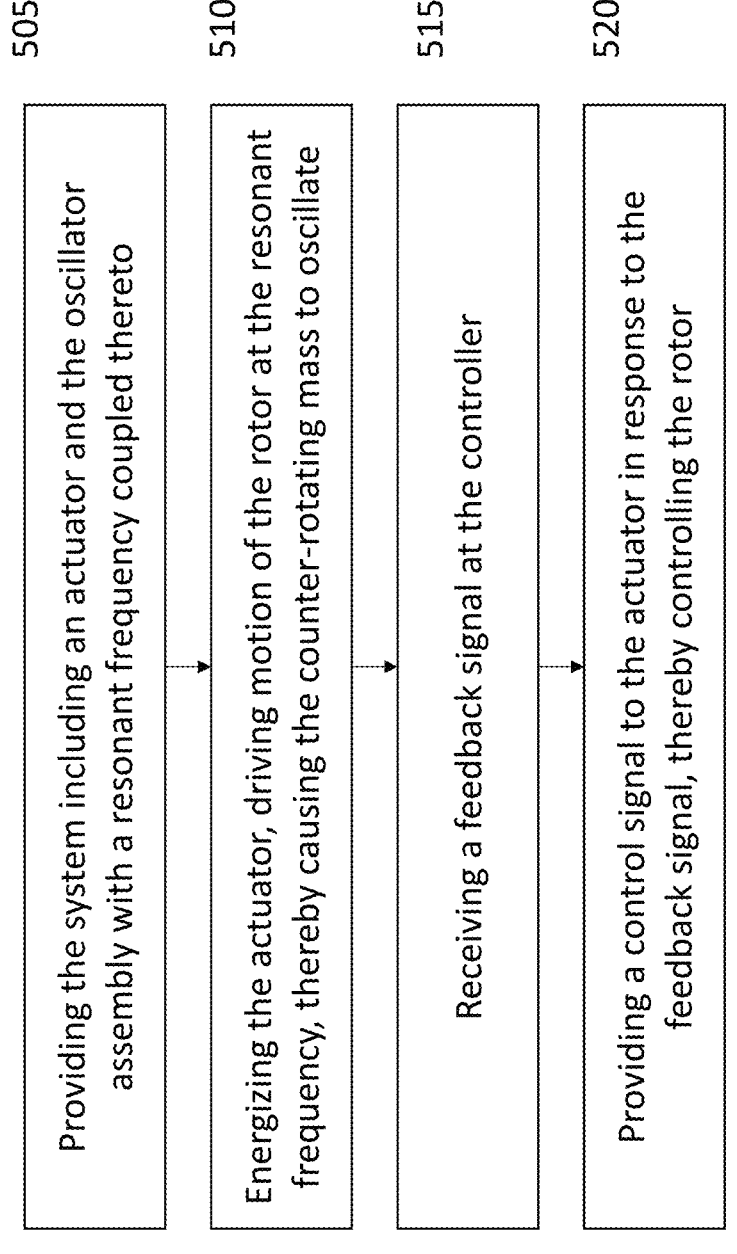

505 Providing the system including an actuator and the oscillator assembly with a resonant frequency coupled thereto 510 Energizing the actuator, driving motion of the rotor at the resonant frequency, thereby causing the counter-rotating mass to oscillate 515 Receiving a feedback signal at the controller 520 Providing a control signal to the actuator in response to the feedback signal, thereby controlling the rotor

OSCILLATOR ASSEMBLY WITH COUNTER-ROTATING MASS

FIELD OF THE INVENTION

Embodiments of the present disclosure generally relate to the use of a counter-rotating mass to transfer torque in a single-degree-of-freedom oscillator.

BACKGROUND

There exists a need for assemblies, systems, and methods to control the motion (e.g., maintain uniform velocity of the movable components) of a single-degree-of-freedom mechanical oscillatory system.

SUMMARY OF THE INVENTION

Provided herein are oscillatory assemblies, systems, and methods for controlling oscillatory motion. To achieve these and other advantages and in accordance with the purpose of the disclosed subject matter, as embodied and broadly described, the disclosed subject matter includes an assembly includes a stator, a rotor and at least one rotor magnet disposed on the rotor. The rotor magnet configured to move with the rotor between a first terminal point and a second terminal point. The assembly includes a counter-rotating mass (CRM) rotatably and elastically mounted on the stator, wherein the rotor is rotatably mounted on the CRM. The CRM including a first energy conversion element (ECE) disposed on the CRM, wherein the first ECE is configured to transfer torque from the rotor to the CRM, thereby causing rotation of the CRM and at least a second ECE disposed on the CRM, wherein the second ECE is configured to transfer torque from the rotor to the CRM, thereby causing rotation of the CRM.

To achieve these and other advantages and in accordance with the purpose of the disclosed subject matter, as embodied and broadly described, the disclosed subject matter also includes an oscillatory assembly which includes a stator, a rotor configured to move with one degree of freedom relative to the stator and a counter-rotating mass (CRM) elastically and rotatably mounted on the stator, wherein the rotor is rotatably mounted on the CRM, the CRM configured to rotationally oscillate relative to the stator and to rotate with one degree of freedom relative to the stator and the rotor. The rotor further includes at least a first rotor magnet and a second rotor magnet, each mounted on the rotor, the first rotor magnet configured to move with the rotor between a first terminal point and a second terminal point, the second rotor magnet configured to move with the rotor between a third terminal point and a fourth terminal point. The CRM comprises at least a first, a second, a third and a fourth torque transfer magnets disposed on the CRM proximal to the first, second, third, and fourth terminal points of the rotor, respectively, each torque transfer magnet generating a magnetic field configured to repel the rotor magnets. The first rotor magnet is magnetically coupled to the first and second torque transfer magnets, and the second rotor magnet is magnetically coupled to the third and fourth torque transfer magnets, the first rotor magnet generating a magnetic field that causes the first and second torque transfer magnets to move the CRM, and the second rotor magnet generating a magnetic field that causes the third and the fourth torque transfer magnets to move the CRM. The stator comprises at least one coil positioned external to a path travelled by each of the rotor magnets, wherein the at least one coil is electromagnetically coupled to the rotor magnets and is configured to, upon energizing, generate a magnetic field that causes the rotor to move.

To achieve these and other advantages and in accordance with the purpose of the disclosed subject matter, as embodied and broadly described, the disclosed subject matter includes a system includes the oscillator assembly and an actuator coupled to the rotor, the actuator configured to move the rotor.

To achieve these and other advantages and in accordance with the purpose of the disclosed subject matter, as embodied and broadly described, the disclosed subject matter also includes a method of oscillating a rotor at a resonant frequency. The method includes providing the system, wherein the assembly is an oscillator comprising a resonant frequency, and wherein the actuator is configured to drive motion of the rotor at the resonant frequency and wherein the counter rotating mass is configured to oscillate in response to the oscillation of the rotor. The method includes energizing the actuator, thereby causing the rotor and the counter rotating mass to oscillate between the first and second terminal points at the resonant frequency.

To achieve these and other advantages and in accordance with the purpose of the disclosed subject matter, as embodied and broadly described, the disclosed subject matter also includes a LIDAR scanning system including a light source configured to generate at least one light beam. An oscillator assembly, the assembly including a stator, a rotor configured to move with one degree of freedom relative to the stator, the rotor further including at least one rotor magnet disposed on the rotor, wherein the at least one rotor magnet is configured to move with the rotor between a first terminal point and a second terminal point. The assembly including a counter-rotating mass (CRM) rotatably and elastically mounted on the stator, wherein the rotor is rotatably mounted on the CRM, the CRM configured to move with one degree of freedom relative to the stator and the rotor, the CRM further including at least a first energy conversion element (ECE) disposed on the CRM, wherein the first ECE is configured to transfer torque from the rotor to the CRM, thereby causing rotation of the CRM and at least a second ECE disposed on the CRM, wherein the second ECE is configured to transfer torque from the rotor to the CRM, thereby causing rotation of the CRM. The system including a light deflector coupled to the rotor, a first actuator coupled to the rotor, the first actuator configured to rotate the light deflector about a first scan axis, a second actuator configured to rotate the light deflector about a second scan axis, the light deflector configured to deflect the at least one light beam to a field of view (FOV), and at least one processor configured to control the light source, the first actuator and the second actuator to cause the light deflector to scan the FOV.

BRIEF DESCRIPTION OF THE SEVERAL VIEWS OF THE DRAWINGS

A detailed description of various aspects, features, and embodiments of the subject matter described herein is provided with reference to the accompanying drawings, which are briefly described below. The drawings are illustrative and are not necessarily drawn to scale, with some components and features being exaggerated for clarity. The drawings illustrate various aspects and features of the present subject matter and may illustrate one or more embodiment(s) or example(s) of the present subject matter in whole or in part.

FIG. 4 is a perspective view of an oscillator assembly coupled to a payload (e.g., a mirror) according to embodiments of the disclosed subject matter.

FIG. 5 is a flow diagram of a method for oscillating a rotor at a resonant frequency.

DETAILED DESCRIPTION

Reference will now be made in detail to exemplary embodiments of the disclosed subject matter, an example of which is illustrated in the accompanying drawings. The method and corresponding steps of the disclosed subject matter will be described in conjunction with the detailed description of the system.

Figure 1:
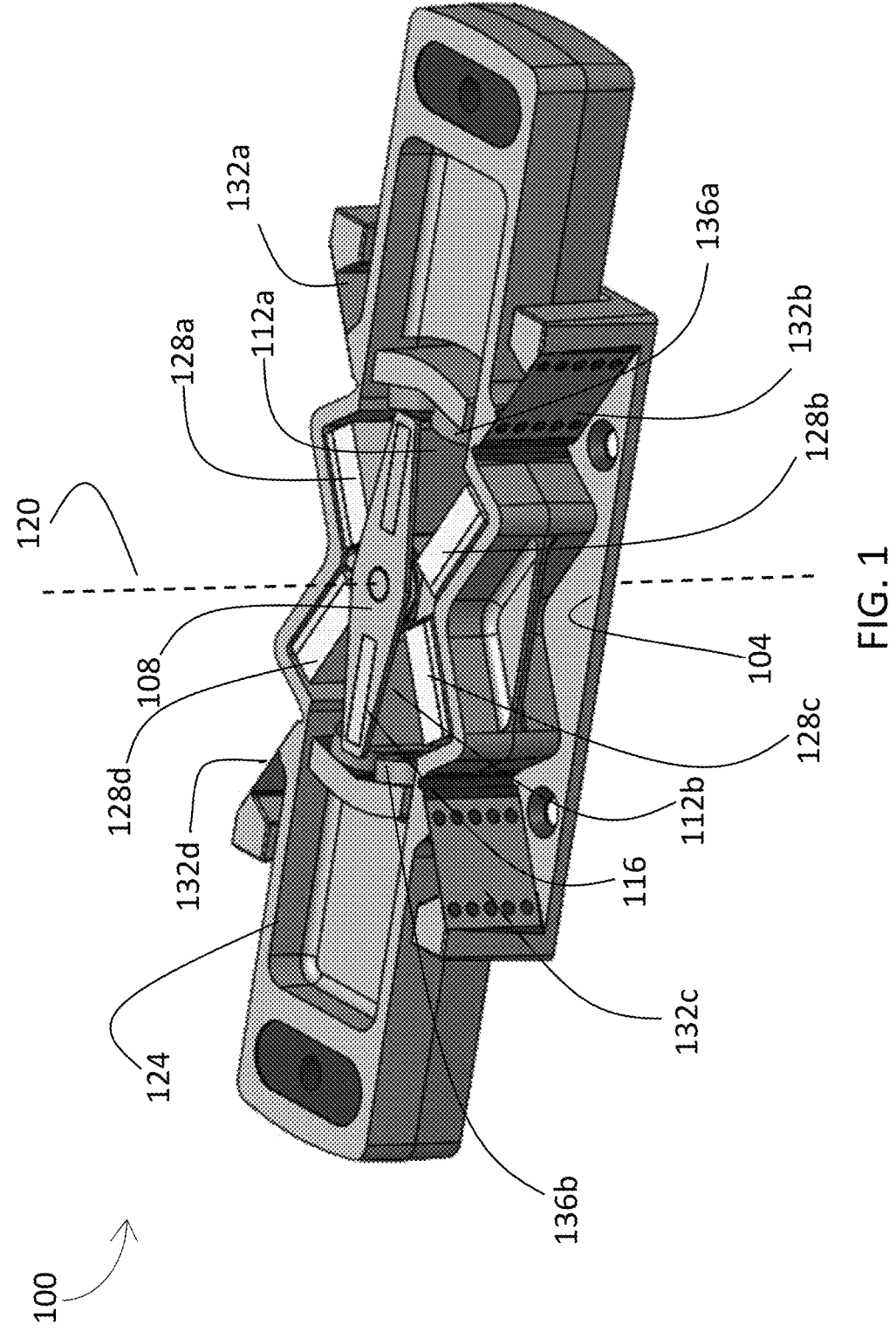
FIG. 1 is a perspective view of oscillator assembly with a counter-rotating mass according to embodiments of the disclosed subject matter.

For purpose of explanation and illustration, and not limitation, an exemplary embodiment of the system in accordance with the disclosed subject matter is shown in FIG. 1 and is designated generally by reference character 100. Similar reference numerals (differentiated by the leading numeral) may be provided among the various views and Figures presented herein to denote functionally corresponding, but not necessarily identical structures.

Two problems that are frequently contemplated when designing mechanical oscillatory systems include: 1.) minimizing the power consumption of the oscillatory system, and 2.) maintaining a uniform velocity of the oscillator throughout the range of motion of the oscillator. To reduce (e.g., minimize) power consumption in an oscillatory system, the oscillatory system should be driven at a resonant frequency, such as the fundamental resonant frequency (i.e., the lowest energy resonant frequency) of the system. Driving the oscillatory system at the resonant frequency reduces actuator and/or control requirements and, thus, reduces the power required to drive the system. Resonant frequencies of a system may change, for example, by modifying system geometry, system materials, mass of the oscillator, by adding or removing components such as springs and/or dampeners, and/or a counter-rotating mass among other things. When resonant frequencies of an oscillatory system change, the system should adjust for this change and continue to drive the oscillator at the resonant frequency to reduce power requirements.

As the oscillator approaches the ends of its range-of-motion and changes oscillation direction, velocity of the oscillator may not be uniform (e.g., may be slower or faster) through this change-of-direction when compared to the velocity of the oscillator in the other parts (e.g., the middle) of the range-of-motion.

In certain applications, maintaining a uniform velocity throughout the entire range of motion of the oscillator provides better results. For example, Laser Detection and Ranging (LIDAR) is one specific example of an application where these problems arise. In LIDAR, one or more mirrors oscillate at high frequencies back and forth across a field of view (FOV). While smaller mirrors may be easier to drive and control for angular velocity, larger mirrors take more energy to drive and control due to increased momentum. Moreover, LIDAR systems collect data points (i.e., reflection of light) during the oscillation of the mirrors and a uniform velocity of the oscillating mirror may be required to provide equal measurement time to all pixels (e.g., time of flight, number of repetitions), thereby resulting in a substantially uniform resolution across the FOV.

These problems may be solved through the use of magnetic bumpers that provide a non-linear force on an oscillator (e.g., a rotor) having one or more magnets attached thereto as the oscillator magnet(s) approach the magnets at each end of the range-of-motion as well as one or more counter-rotating masses configured to oscillate in the same or opposite direction of the other components of the system, namely the rotor. As the oscillator approaches the ends of its range of motion, the magnet(s) attached to the oscillator—and therefore the oscillator itself—will experience a non-linearly (e.g., exponentially) increasing magnetic force as the oscillator approaches closer to the ends of its range of motion. The magnets may prevent any potential impact of the oscillator with another part of the system due to the increasing magnetic repulsion at the ends of its range of motion, reducing the likelihood of damage.

Disclosed herein are systems and assemblies for controlling motion of a single-degree-of-freedom oscillator using a counter-rotating mass where the oscillator is configured to oscillate at a resonant frequency of the system. Additionally, disclosed herein are methods of controlling motion of a single degree-of-freedom oscillator using a counter-rotating mass.

Referring now to FIG. 1, an oscillator assembly 100 with a counter-rotating mass is shown in perspective view with various components removed for clarity of illustration. Oscillator assembly 100 includes a stator 104. Stator 104 may be a planar component with a cutout in the center thereof. Stator 104 may include one or more bosses with an electromagnetic coil disposed thereon. For the purposes of this disclosure, a "boss" is a protrusion or raised portion of a component surface. Stator 104 may include one or more components configured to generate a magnetic field such as an electromagnet, electromagnetic coil, a voice coil, at least one permanent magnet, or a combination thereof, alone or in combination. Stator 104 may include one or more bosses or portions that form one or more arcs defining a circular area therebetween. In various embodiments the cutout through stator 104 may be circular (or partially circular) and concentric with the bosses or portions thereof. In various embodiments, stator 104 may include a single, continuous part. For example, the stator may include a singular part, such as a block, having at least one coil, such as an electromagnetic coil attached thereto. In another example, the stator may include a horseshoe shape with magnets at the ends of the horseshoe shape.

In various embodiments, stator 104 may include discontinuous parts where each discontinuous part includes a magnet, electromagnetic coil (such as 136*a*, 136*b*), or the like. For example, the stator may include two separate parts that each have an electromagnet affixed thereto. In various embodiments, the stator includes a first stator magnet and second stator magnet. In various embodiments, each stator may include two stator magnets. In various embodiments, the stator includes more than two (e.g., three) stator magnets. In various embodiments, the stator may include a housing configured to affix the stator magnet(s) and contain the oscillator assembly 100.

In various embodiments, stator 104 may include one or more stator magnets that are permanent magnets. In various embodiments, the stator magnets are electromagnets. In various embodiments, the electromagnets are driven by a DC current. In various embodiments, the electromagnets are driven by an AC current.

In various embodiments, the stator magnet(s) are single magnets having a single north pole and a single south pole. In various embodiments, the stator magnet(s) includes more than one magnet in a stacked arrangement and thus include two or more north and south poles. In various embodiments, the stacked magnets are arranged such that the north and south poles are oriented vertically. In various embodiments, the stacked magnets are arranged such that the north and south poles are perpendicular to a path of the rotor (e.g., in a rotational system, the magnets are arranged such that the north and south poles are parallel with a radial axis extending from a rotational axis). In various embodiments, the stacked arrangement of magnets are arranged such that the north and south poles are oriented horizontally. In various embodiments, the stacked magnets are arranged such that the north and south poles are along (e.g., parallel with, tangential to, etc.) a path of the rotor. One of ordinary skill in the art would appreciate that the description of permanent magnets with respect to "stator magnets" may be applied to any magnets herein, in various embodiments of the disclosed subject matter.

Still referring to FIG. 1, oscillator assembly 100 includes a rotor 108. Rotor 108 is configured to move with one degree of freedom relative to stator 104. Rotor 108 may be rotatably fixed to stator 104, in various embodiments. Rotor 108 may be concentrically and centrally fixed to stator 104, in various embodiments. Rotor 108 includes at least one rotor magnet 112a disposed on the rotor, wherein rotor magnet 112a is configured to move with rotor 108 between a first terminal point (604 of FIG. 6a) and a second terminal point (608 of FIG. 6b). Rotor magnet 112a may be one or more permanent magnets. Rotor magnet 112a may be one or more electromagnets.

For example, the rotor may be configured for linear motion. In another example the rotor may be configured for rotational motion. In various embodiments, the rotor magnets include permanent magnets. In various embodiments, the rotor magnets include electromagnets.

In various embodiments, the rotor magnet(s) are single magnets having a single north pole and a single south pole. In various embodiments, the rotor magnet(s) includes more than one magnet in a stacked arrangement and thus include two or more north and south poles. In various embodiments, the stacked arrangement of magnets are arranged such that the north and south poles are oriented vertically. In various embodiments, the stacked arrangement of magnets are arranged such that the north and south poles are oriented horizontally. In various embodiments, the north and south poles of the stacked magnets alternate within each stack. One of ordinary skill in the art would appreciate the numerous arrangements of magnets alone or in combination that may be disposed thereon.

Rotor 108 may include a rotor arm 116. Rotor arm 116 may be rotatably fixed to rotor 108 at a central location along its length such that rotation of rotor arm 116 is rotation about its center point. Rotor arm 116 may rotate about a rotational axis 120. Axis 120 may be disposed normal to a base portion of stator 104 and axially and concentrically disposed through rotor 108. Rotor arm 116 may be free to rotate about the rotational axis 120 free from mechanical infringement. Rotor arm 116 may be free to rotate about the rotational axis 120 until rotor arm 116 abuts one or more other components such as a portion of stator 104 or any component described herein. Rotor arm 116 may be free to travel in an arc spanning from the first terminal point 604 to the second terminal point 608 (shown in FIG. 6), in various embodiments. Rotor arm 116 may be free to travel in an arcuate path between two end points defined by magnetic field or physical blocking component. Rotor 108 may include at least a second rotor magnet 112b. The second rotor magnet 112b may be disposed on rotor arm 116. The second rotor magnet 112b may be disposed at the opposite end of rotor arm 116 of the first rotor magnet 112a. The second rotor magnet 112b may rotate with rotor arm 116 between a third terminal point (612) and a fourth terminal point (616 shown in FIG. 6).

Still referring to FIG. 1, oscillator assembly 100 includes a counter-rotating mass (CRM) 124 rotatably and elastically mounted on the stator 104. For the purposes of this disclosure, "elastically mounted" refers to a mode of mounting or attaching a first component to a second component whereby a displacement relative to one another results in a restorative force acting to counteract the displacement. In various embodiments, rotor 108 may be rotatably mounted on the CRM. CRM 124 is configured to move with one degree of freedom relative to stator 104 and rotor 108. As previously stated above, rotor 108 may be rotatably mounted on stator 104 in various embodiments. CRM 124 is configured to rotationally oscillate relative to stator 104.

Referring again to FIG. 1, CRM 124 is elastically and rotatably mounted on stator 104 by at least one flexure 132a. In various embodiments, CRM 124 may be elastically and rotatably mounted on stator 104 by four flexures 132a, 132b, 132c, 132d, as in FIG. 1. For the purposes of this disclosure, "flexure" is a flexible element or combination of elements configured to be compliant in specific degrees of freedom. As seen in FIG. 1, and in various embodiments, flexure 132a-d may be a thin piece of flat material such as steel fixed to stator 104 and CRM 124. For example and without limitation, flexure 132a-d may be fixed to stator 104 by pins or other mechanical fasteners and welded to CRM 124 in various arrangements. For example and without limitation, flexure 132a-d may be welded to stator 104 and mechanically fastened to CRM 124. In various embodiments, flexure 132a-d may be mechanically fastened to both CRM 124 and stator 104. In various embodiments, flexure 132a-d may be brazed or soldered to one or both of CRM 124 and stator 104.

In various embodiments, flexure 132a-d may be a pin flexure such as a thin bar or cylinder of material, constraining three degrees of freedom when geometry matches a notch cutout. In various embodiments, flexure 132a-d may be a blade flexure such as a thin sheet of material, constraining three degrees of freedom. In various embodiments, flexure 132a-d may be a notch flexure such as a thin cutout on both sides of a relatively thick piece of material, which constrains five degrees of freedom. In various embodiments, flexure 132a-d may be a hinge or living hinge configured to constrain specific degrees of freedom. In various embodiments, flexure 132a-d may be a leaf spring or suspension flexure. In various embodiments the flexible connectors include a ribbon of material (e.g., a polymer, a metal, a composite material, etc.). In various embodiments, the flexible connector is a flex pivot. In various embodiments, flexure 132a-d may be configured to elastically attach CRM 124 to stator 104 at regular intervals about the rotational axis

120. In various embodiments, flexure 132*a-d* may be mounted from CRM 124 to stator 104 at four points about the rotational axis 120 that are not regularly and angularly spaced apart.

In various embodiments, the flexures 132*a-d* may be made of a metal (e.g., spring steel, stainless steel, titanium, grades of bronze, etc.). In various embodiments, the flexures 132*a-d* are made of a polymer. In various embodiments, a material for the flexures 132*a-d* has an elastic modulus in the range of 100 GPa to 310 GPa to thereby provide a coupling that allows the CRM 124 to rotate about an axis such as rotational axis 120 and/or provide additional control of CRM oscillation. In various embodiments, a material for the flexures 132*a-d* has an elastic modulus in the range of 200 GPA to 210 GPa. In various embodiments, the flexibility of the flexures may be adjusted by swapping out one flexure material for another material to thereby adjust control parameters of the CRM 124 during oscillation. In various embodiments, the flexures are rigid such that rotation of the CRM 124 is permitted up to a required angle. In various embodiments, as an alternative to flexures.

Referring again to FIG. 1, CRM 124 is elastically and rotatably mounted on stator 104 by at least one bearing. For the purposes of this disclosure, "bearing" is a mechanical component that bears friction and couples at least one component thereto. For example and without limitation, at least one bearing may be at least one ball bearing. In various embodiments, a ball bearing may be utilized to mount CRM 124 on stator 104. The ball bearing may include an inner ring fixed to CRM 124 and an outer ring fixed to stator 104, the inner and outer rings fixed concentrically to one another by suspended metal balls captured therebetween. In such an arrangement the CRM 124 and stator 104 may rotate with one degree of freedom relative to each other. In embodiments wherein CRM 124 is mounted on stator 104 by a ball bearing, one or more elements that provide a restoring force may be attached to each of the CRM 124 and stator 104. For example, at least one flexure consistent with the description of flexures 132*a-d* herein, may be attached to a portion of CRM 124 and stator 104 in addition to the ball bearing. In various embodiments a spring may be attached to a portion of CRM 124 and stator 104, the spring providing a force that opposes the relative displacement of CRM 124 and stator 104. In various embodiments at least one bearing may be a torsion bearing. A torsion bearing may include a first surface fixed to the CRM 124 and a second surface fixed to stator 104, the first and second surfaces of the torsion bearing fixed together concentrically and rotatably capturing a spring or some other type of biasing component such as a spiral spring, garter spring, spring belt or the like. In such an arrangement CRM 124 and stator 104 may be rotatably and elastically fixed together wherein each is free to move with one degree of freedom relative to each other. In various embodiments, any flexure 132*a-d* may be a plain and sleeve bearing. A plain component may be fixed to stator 104 and a sleeve component may be fixed to CRM 124, the plain component including a cylindrical shape with an outer diameter smaller than the inner diameter of the sleeve component, and concentrically seated therein. In such an arrangement the plain component is configured to rotate within the sleeve component, thereby rotatably fixing stator 104 and CRM 124 together. In embodiments utilizing a plain and sleeve bearing, a spring, flexure, or biasing component as described in reference to the ball bearing mounting may be used to provide a restoring force to oppose the relative displacement of CRM 124 and stator 104.

In various embodiments, the stator 104 includes an open top portion for access to the components of the assembly 100. In various embodiments, one or more flexures 132*a-d* affix the stator 104 to the rotor 108. In various embodiments, the one or more flexures 132*a-d* exert a linear spring force on the CRM 124 proportional to the displacement and elastic modulus of the flexure 132*a-d*. In various embodiments, the flexures do not contribute to resonance of the system. In various embodiments, the rotor is rotationally coupled to the CRM 124 via a bearing as an alternative to the flexures.

Still referring to FIG. 1, oscillator assembly 100 includes at least a first energy conversion element (ECE) 128*a* disposed on CRM 124 within CRM cutout 216. ECE 128*a* is configured to transfer torque from rotor 108 to CRM 124 at the first terminal point (604 of FIG. 6*a*), thereby causing rotation of CRM 124. At least the first ECE 128*a* is configured to convert energy into one or more other types of energy, heat, and/or movement. The first ECE 128*a* may be configured to convert kinetic energy of the moving rotor 108 into kinetic energy of the CRM 124. For example and without limitation, rotor 108 is actuated by one or more coils such as coil 136*a* or 136*b* disposed on stator 104. In various embodiments, the electromagnetic coils 136*a*, 136*b* may include a plurality of coils. In various embodiments, the electromagnetic coils 136*a*, 136*b* may be positioned to optimize (e.g., maximize) the magnetic force applied to the rotor magnets 112*a*, 112*b* by the electromagnetic coils given the type of motion of the rotor arm(s) 116 (e.g., whether rotational or linear). For example, the plurality of coils may be positioned such that a longitudinal axis of the coils is substantially directed towards the rotational axis 120. In various embodiments, the electromagnetic coils 136*a*, 136*b* provide a magnetic field to control motion of the rotor arm(s) 116. In various embodiments, the electromagnetic coils 136*a*, 136*b* provide a constant magnetic field, for example, by providing a constant voltage to the electromagnetic coils 136*a*, 136*b*. In various embodiments, the electromagnetic coils 136*a*, 136*b* provide a variable magnetic field by adjusting a voltage supplied to the electromagnetic coils 136*a*, 136*b*. One of ordinary skill in the art would appreciate that each electromagnetic coil may include a plurality of electromagnetic coils and the depiction in any of the Figures herein may be depicted for ease of understanding. In various embodiments, electromagnetic coils 136*a*, 136*b* may be mounted on CRM 124. In various embodiments, electromagnetic coils 136*a*, 136*b* may be mounted on a wholly separate component mounted on the stator 104 or CRM 124 and configured to house said electromagnetic coils 136*a*, 136*b*. In various embodiments wherein the electromagnetic coils 136*a*, 136*b* are housed in a distinct component mounted on either of stator 104 and CRM 124, the component may be configured to surround at least a portion of rotor 108 and allow for relative rotational of CRM 124 and rotor 108.

Rotor 108 with rotor magnet 112*a* travel in an arcuate path until the ECE 128*a*, which has a corresponding surface to rotor magnet 112*a* provides some restoring force such as a magnetic or spring-based kinetic force to alter the direction of the rotor 108 and impart movement to CRM 124 on which it is disposed. In various embodiments, a surface of the energy conversion elements (ECE), such as a permanent magnet disposed on the counter-rotating mass (CRM) corresponds to a surface of at least one rotor magnet 112*a* or 112*b*. In various embodiments, where the ECE magnet has stacked magnets, at least one of the stacked stator magnets has a surface that corresponds to a surface of each rotor magnet. As used herein, a surface of a magnet (e.g., an ECE magnet) corresponds to a surface of another magnet (e.g., at least one rotor magnet) when one surface is configured to move towards or away from the other surface along a path and exert increasingly repulsive magnetic forces on one another as the two surfaces become closer. For example and without limitation, rotor magnet 112a may travel toward ECE 128a in an arcuate path with increasing magnetic repulsion between them, at, for example a first terminal point (604 of FIG. 6a), the repulsion overcomes the momentum of the rotor 108 and changes the direction of travel of rotor 108 oppositely.

In various embodiments, the stator magnet includes two or more stacked magnets where at least two magnets in the stator magnet correspond to two or more stacked magnets in the rotor magnet. In various embodiments, each corresponding surface the stator magnet(s) has a greater area than each corresponding surface of the rotor magnet(s). The point at which ECE 128a interacts with rotor 108 is defined as the first terminal point 604. As the rotor oscillates the at least one rotor magnet 112a along a path (e.g., linear or arcuate) between terminal points (604, 608, 612, 616), the rotor magnet(s) approaches one or more ECE 128a or 128b magnets at each of the first and second terminal points 604, 608 that exert an increasing repulsive force on the rotor magnet(s). In various embodiments, the repulsive force between the ECE 128a, 128b magnet(s) and the rotor magnet(s) 112a is used to control a speed (e.g., linear velocity or angular velocity) of the rotor. In various embodiments, the repulsive force between the coils 136a, 136b and the rotor magnet(s) 112a, 112b is used to reverse the direction of the oscillating rotor 108 while maintaining a substantially constant velocity between the terminal points.

CRM 124 includes ECEs 128a mounted on the CRM 124, located at the extremities of the rotation span of rotor 108 and defining first and second terminal points 604 and 608. The ECEs 128a-d are mounted with the repelling pole facing the rotor magnet 112, such that when the magnet 112a or 112b approaches close to the ECE 128a-b or 128c-d, respectively, the repulsive force on the magnet 112a or 112b facilitates the change in rotation direction of the rotor magnet 112a or 112b, and in turn, the rotor 108. The repulsive force on the rotor magnet 112a and/or 112b generates a torque on the mirror. The repulsive force between the rotor magnet 112a and/or 112b and ECEs 128a-b and/or 128c-d, respectively is applied with no impact between the rotor magnet 112a-b and the ECEs 128a-d as the rotor magnet 112a oscillates between the terminal points 604, 608 and the second rotor magnet 112b oscillates between the terminal points 612, 616. Because no impact occurs between the magnets, noise, aging effects and probability of damage to the magnets due to impact are reduced, if not eliminated.

In various embodiments, the width of each energy conversion element ECE 128a-d magnet may be greater than the width of each corresponding rotor magnet 112a-b, thereby providing a greater static overlap area (i.e., the area of stator magnet facing the rotor magnet is larger than the area of the rotor magnet). In various embodiments, the size (length and/or width) of each stator magnet may be increased such that there is no inertial impact on the system, but so that there is a benefit in the resonance frequency (e.g., a higher resonance frequency is obtainable). Increasing the size of the stator magnet also allows for a higher assembly tolerance. In various embodiments, providing end magnets may induce a greater torque on the rotor magnet by utilizing the potential magnetic energy more effectively. In various embodiments, where weaker magnetic materials are used, greater torque may be required to adequately repel the rotor magnets during oscillation.

Still referring to FIG. 1, in various embodiments CRM 124 includes at least a first, a second, a third and a fourth torque transfer magnets 128a-d disposed on the CRM 124 proximal to the first, second, third, and fourth terminal points (604, 608, 612, 616 of FIGS. 6a-b) of the rotor 108, respectively, each torque transfer magnet 128a-d generating a magnetic field configured to repel the rotor magnets 112a, 112b. The first rotor magnet 112a may be magnetically coupled to the first and second energy conversion elements 128a, 128b, in this case embodied as torque transfer magnets 128a, 128b. The second rotor magnet 112b may be magnetically coupled to the third and fourth torque transfer magnets 128c, 128d. The first rotor magnet generating or having naturally a magnetic field that causes the first and second torque transfer magnets 128a, 128b to move the CRM 124 when the first rotor magnet 112a is at the first or the second terminal points 604, 608, and the second rotor magnet 112b generating a magnetic field that causes the third and the fourth torque transfer magnets 128c, 128d to move the CRM 124 when the rotor is at the third or fourth terminal points 612, 616.

The first rotor magnet 112a on rotor arm 116 includes at least two sides and the second rotor magnet 112b similarly includes at least two sides. The ECE magnets 128a, 128b are mounted on CRM 124. Each face may be substantially perpendicular to a path traveled by the one or more rotor magnets 112a, 112b. In various embodiments, the force on the system or oscillator assembly 100 due to the magnets is balanced, where each rotor magnet 112a, 112b may experience an equal and opposite magnetic field in the direction facilitating the rotation. Due to the symmetry of the system 400, although the magnetic repulsion is normal to the magnet face (i.e., a straight path) and the motion of the rotor magnet 112a-b is in an arc, the force on the axle is equal with that applied on the opposite side, causing rotation of the rotor, as the torque is applied in the same direction on both sides of rotor 108.

With continued reference to FIG. 1, rotor magnet 112a may be magnetically coupled to each of the first and second ECEs 128a, 128b. The rotor magnet 112a generating (or naturally having) a magnetic field configured to interact and repel each of the ECEs 128a, 128b. The repulsion of ECEs 128a, 128b causes CRM 124 to move, thus transferring torque from rotor 108 to CRM 124.

Similarly, rotor magnet 112b may be magnetically coupled to each of the third and fourth ECEs 128c, 128d. The rotor magnet 112b generating (or naturally having) a magnetic field configured to interact and repel each of the ECEs 128c, 128d. The repulsion of ECEs 128c, 128d causes CRM 124 to move, thus transferring torque from rotor 108 to CRM 124. The repulsion of 128c may cause the CRM 124 to move the same direction as repulsion of 128a causes. Conversely, the repulsion of 128b causes the CRM 124 to move the same direction as repulsion of 128a.

In this way, the repulsive force from the ECEs 128a-d facilitates a change in rotational direction (e.g., clockwise to counter-clockwise) of the rotor arm 116 while maintaining a substantially constant magnitude of velocity (e.g., angular velocity) of the rotor. In various embodiments, a payload (e.g., a mirror) is coupled to the rotor 108. In various embodiments, the payload is coupled to an axle of the rotor 108. In various embodiments, the payload may share the same rotational axis as the rotor 108. In various embodiments, the rotational axis of the payload may be different than the rotational axis of the rotor 108. In various embodiments, the rotor 108 is positioned above the payload. In various embodiments, the rotor 111 is positioned below the payload. In various embodiments, the rotor 108 rotates about a rotational axis 120 of the deflector rotation. In various embodiments, the axis 120 is the same axis of rotation of the payload (e.g., a mirror). In various embodiments, the axis 120 of rotation of the rotor 108 is a different axis of rotation of the payload.

Still referring to FIG. 1, oscillator assembly includes at least a second ECE 128b disposed on CRM 124 within CRM cutout 216. The second ECE 128b is configured to transfer torque from the rotor 108 to the CRM 124, the second ECE 128b may transfer torque at the second terminal point 608 of FIG. 6b, thereby causing rotation of the CRM 124. The first and second ECEs 128a, 128b may be configured to change the rotation of rotor 108 back and forth between a first and second terminal points 604, 608, thereby inducing an oscillation of the CRM 124 as the torque is transferred to the CRM 124. For example and without limitation, oscillator assembly 100 may be configured to oscillate the CRM 124 in response to the oscillation of the rotor 108. In various embodiments, the rotor 108 and CRM 124 may oscillate out of phase with each other at a predetermined lag time. For example and without limitation, rotor 108 and CRM 124 may rotate oppositely such that as the rotor 108 reaches the farthest point in its rotation in one direction, the CRM 124 may reach the farthest point in its rotation in the opposite direction. There may be a spin-up time of oscillator assembly 100 wherein rotor 108 imparts an oscillation to the CRM 124 wherein the amplitude of the oscillation increases to a steady state amplitude after a certain amount of time.

In various embodiments, one or more end magnets may be disposed on an end of the ECE magnets and or electromagnetic coils to improve magnetic force applied to the rotor magnet(s). As used herein, an "end magnet" is an outer-most magnet in a stack of three or more magnets or, where the stacked magnets are two magnets, the end magnet is disposed on a side of the other magnet. In example embodiments, an end magnet extends beyond the surfaces of the stacked stator magnets in the direction of travel of the rotor between the terminal points. In various embodiments, the ECE 128a-d magnet(s) may have a larger cross sectional area perpendicular to the path of the rotor magnets 112a-b than the cross sectional area of the other stator magnet(s). In various embodiments, the volume of the ECE 128a-d magnet(s) may be larger than the volume of the rotor magnet(s) 112a-b. In various embodiments, the volume of rotor magnet(s) 112a-b may be larger than the volume of the ECE 128a-d magnet(s).

In various embodiments, any of the magnets described herein may be neodymium-iron-boron (NdFeB) magnets. In various embodiments, any of the magnets described herein may be samarium-cobalt (SmCo) magnets.

In various embodiments, the at least a first and second ECEs 128a, 128b may include one or more springs. The one or more springs configured to transfer torque from rotor 108 to CRM 124. In various embodiments where the ECEs 128a, 128b include one or more springs, the springs include mechanical characteristics catered to oscillator assembly 100. The one or more springs may include spring constants and/or elastic moduli, the springs configured to transfer torque from rotor 108 to CRM 124. The one or more springs may be configured to include an amount of turns or lengths of said turns configured to transfer torque from rotor 108 to CRM 124. The one or more springs may be fixed to a portion of CRM 124 and rotor arm 116, such that at the first and second terminal points 604, 608, the spring is compressed and then extends, changing the direction of rotation of the rotor arm 116 and imparting a rotation in the initial direction of the rotor arm to the CRM 124.

In various embodiments of oscillator 100, such as the oscillator assembly of FIG. 1, CRM may include at least a third and a fourth ECEs 128. The third ECE configured to transfer torque from rotor 108 to CRM 124 at a third terminal point and the fourth ECE configured to transfer torque from rotor 108 to CRM 124 at a fourth terminal point. For example and without limitation, the third and fourth terminal points 612, 616 may be at the mirror image locations of the first and second terminal points 612, 616 across the plane of symmetry including the rotational axis 120 and vertically bisecting CRM 124. The third and fourth terminal points 612, 616 may be disposed at either end of an arcuate path traveled by at least a second rotor magnet 112, the second rotor magnet fixed to rotor arm 116.

In various embodiments, one or more assemblies may be included, at distinct positions (e.g., positioned above/below other system components) in order to facilitate a more balanced overall system, increase the total repelling force, etc. For example, a first rotor assembly may rotate clockwise while a second rotor assembly rotates with the same angular velocity but in the opposite rotational direction (i.e., counter-clockwise). In various embodiments, rotor 108 may include more than one rotor arm 116 such as 2, 3, 4, 6, 8 or more rotor arms. In various embodiments, additional arms (e.g., 4 arms, 6 arms, etc.) may be included used to increase the repelling force. In various embodiments, a single arm may be used. In various embodiments, the use of two or more arms may reduce the magnet size required to generate the desired torque on the rotor, and reduce the overall size of the system (e.g., a height of the system).

Figure 2:
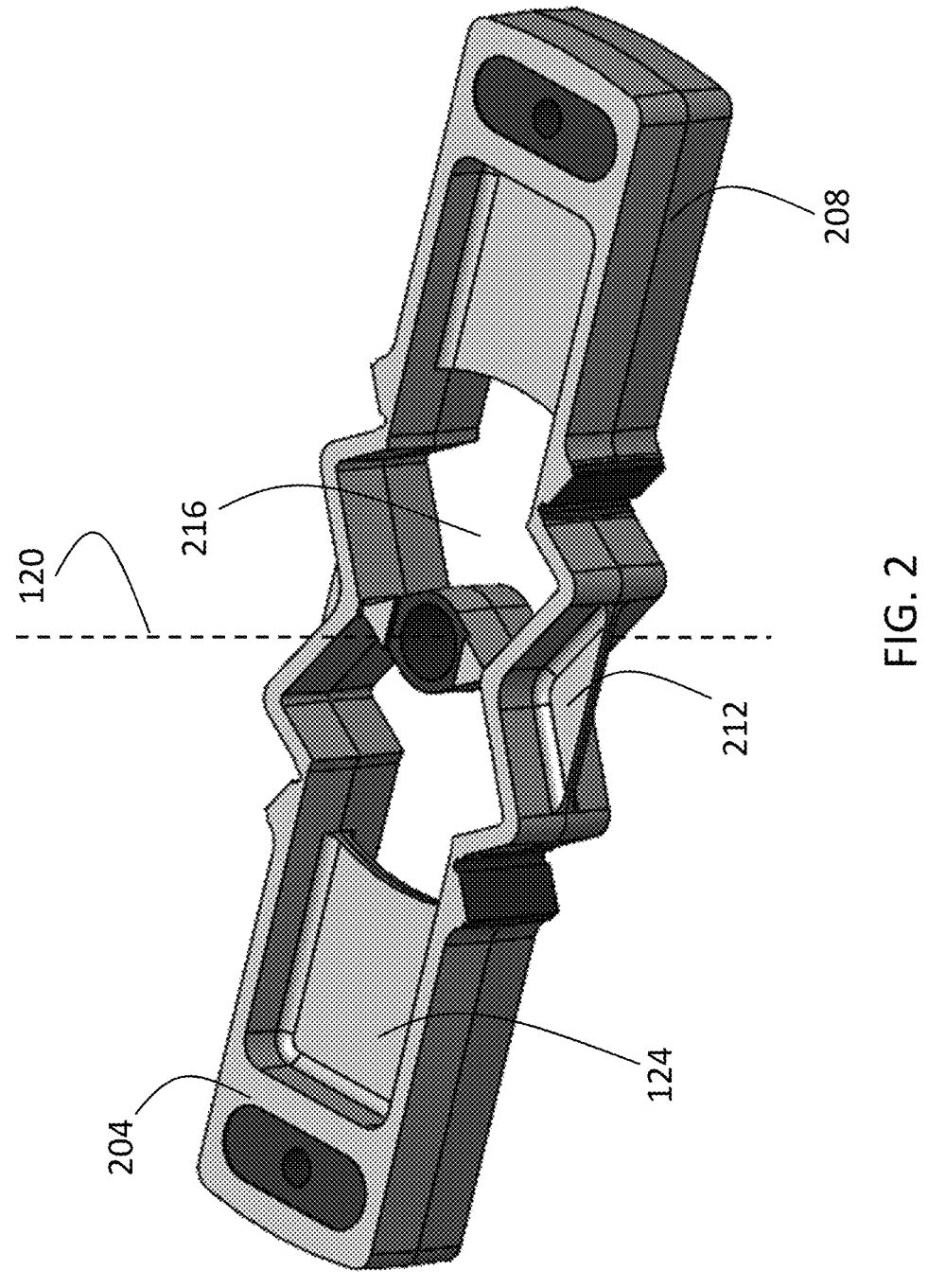
FIG. 2 is a perspective view of a counter-rotating mass configured for use with an oscillator assembly according to embodiments of the disclosed subject matter.

In various embodiments, such as the CRM shown in perspective view in FIG. 2, includes a plurality of parts, continuous or discontinuous from any other part or portion. CRM 124 includes a first terminus 204. First terminus 204 may be characterized by a machined metal portion such as steel, a composite, a plastic, a rubber, or combination of materials. First terminus 204 may be of solid cross-sectional thickness including one or more cutouts, notches, gouges, holes, or apertures. First terminus 204 may be characterized by a substantially rectangular planform shape extending away from rotational axis 120. First terminus 204 may be configured to have a greater mass than any other portion of oscillator assembly 100. CRM 124 includes a second terminus 208. Second terminus 208 may be a mirror image of first terminus 204 across a plane of symmetry containing the rotational axis and normal to the planform shape of first terminus 204. Second terminus 208 may include a substantially solid and rectangular planform shape. CRM 124 may include a central portion 212 disposed between first terminus 204 and second terminus 208. Central portion 212 may include a cutout 216 therethrough wherein the rotor is disposed within the cutout, the rotor and the CRM being coaxially disposed. Central cutout 216 may include a rotor shaft aperture configured to retain and rotatably fix the rotor shaft of rotor 108 within CRM 124.

The arrangement and design of CRM 124 may have a moment of inertia. For the purposes of this disclosure, "moment of inertia" is a quality of a rigid body that determines the torque needed for a desired angular acceleration about a rotational axis. Moment of inertia is informed by a body's mass distribution and axis. In the case of CRM 124 may include mass focused at the first terminus 204 and second terminus 208, with relatively little mass disposed at the central portion 212 via cutout 216. In general, a long, relative thin body such as CRM 124 and bodies containing more mass, such as CRM 124 have higher moments of inertia than relatively smaller, lighter bodies with shorter lengths such as rotor 108, specifically rotor arm 116. In various embodiments, CRM 124 may have a moment of inertia that is about 180 times greater than the moment of inertia of rotor 108. In various embodiments, CRM 124 may have a moment of inertia between 180-250 times greater than the moment of inertia of rotor 108. In various embodiments, CRM 124 may have a moment of inertia between 150-250 times greater than the moment of inertia of rotor 108. In various embodiments, CRM 124 may have a moment of inertia greater than 250 times greater than the moment of inertia of rotor 108.

Figure 3:
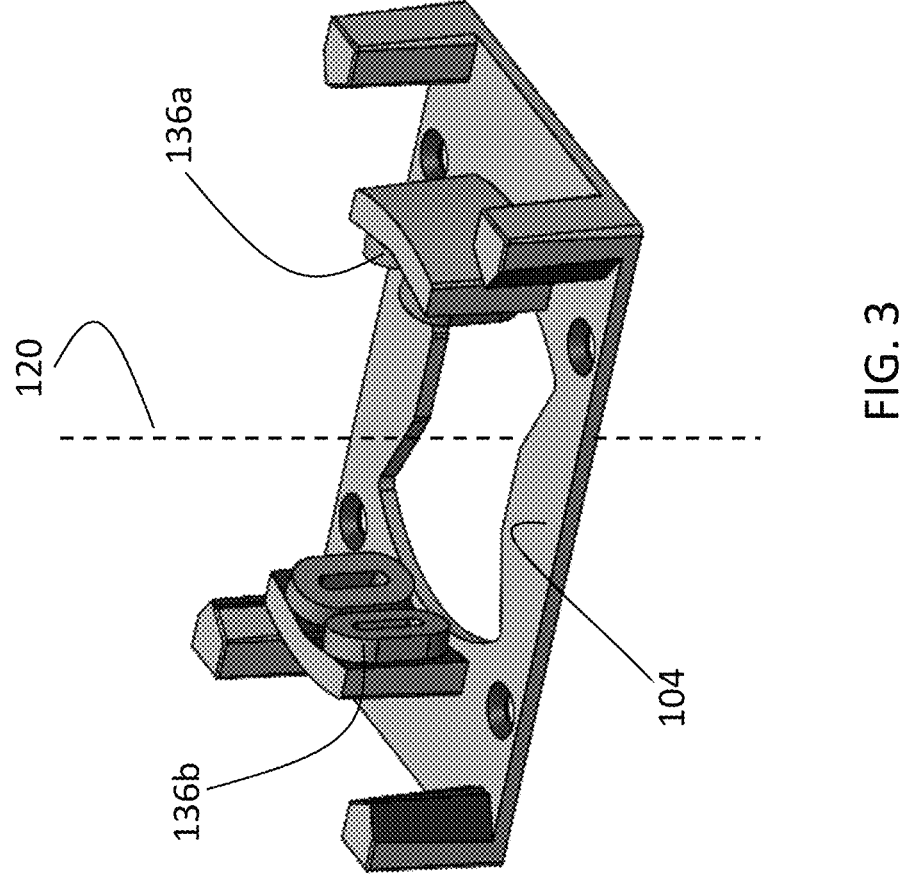
FIG. 3 is a perspective view of a stator configured for use with an oscillator assembly according to embodiments of the disclosed subject matter.

Referring now to FIG. 3, stator 104 is shown in perspective view with the other components removed for clarity. Stator 104 may be a planar component with a cutout in the center thereof. Stator 104 may include one or more bosses with an electromagnetic coil disposed thereon. Stator 104 may include one or more components configured to generate a magnetic field such as an electromagnet, electromagnetic coil, a voice coil, at least one permanent magnet, or a combination thereof, alone or in combination. Stator 104 may include one or more bosses or portions that form one or more arcs defining a circular area therebetween. In various embodiments the cutout through stator 104 may be circular (or partially circular) and concentric with the bosses or portions thereof. In various embodiments, stator 104 may include a single, continuous part. For example, the stator may include a singular part, such as a block, having at least one coil, such as an electromagnetic coil attached thereto. In another example, the stator may include a horseshoe shape with magnets at the ends of the horseshoe shape. In various embodiments one or more structural portions of stator 104 may be composed of magnets and/or electromagnets. In various embodiments the whole of stator 104 may be magnetic and/or electromagnetic, configured to drive one or more other components of system 100, such as rotor 108.

In various embodiments, stator 104 may include discontinuous parts where each discontinuous part includes a magnet, electromagnetic coil, or the like. For example, the stator may include two separate parts that each have an electromagnet affixed thereto. In various embodiments, the stator includes a first stator magnet and second stator magnet. In various embodiments, each stator may include two stator magnets. In various embodiments, the stator includes more than two (e.g., three) stator magnets. In various embodiments, the stator may include a housing configured to affix the stator magnet(s) and contain the oscillator assembly 100.

Stator 104 shown in FIG. 3 includes electromagnetic coils 136a and 136b, wherein each of 136a and 136b are made of two distinct electromagnetic coils each, and for ease of understanding the grouping is labeled. Electromagnetic coils 136a and 136b may be configured to generate a time-varying magnetic field configured to move one or more rotors, such as rotor 108. Stator 104 includes rotational axis 120 disposed perpendicular to the plate portion of stator 104 and centered between electromagnetic coils 136a, 136b. In various embodiments, each of the four corners of stator 104 includes a boss with one or more flat faces disposed thereon. The flat faces of the plurality of bosses may be configured to accept at least one flexure such as flexure 132a-d. Stator 104 may be configured to handle torsional loads exerted thereon by the CRM 124. Stator 104 may include one or more fastening portions such as holes therethrough configured for a mechanical fastener such as a bolt, screw, nail, peg, or the like.

Referring now to FIG. 4, a system 400 includes the oscillator assembly 100. System 400 may include oscillator assembly 100 in various embodiments, including but not limited to the embodiment depicted in perspective view in FIG. 4. In the oscillator assembly shown herein, there are four ECEs disposed on the CRM with CRM cutout disposed corresponding to opposite sides of the first and second rotor magnets. The rotor is free to oscillate between first and second terminal points and third and fourth terminal points, wherein at each terminal point, the ECEs, here shown as permanent magnets, transfer torque from the rotor to CRM, thereby moving CRM in the initial direction of rotor. CRM is shown to be rotatably and elastically mounted on stator by four flexures, such as flexures as shown herein above. The flexures serve to provide a restoring force to CRM and arrest its rotation and moving CRM in the opposite direction of rotation, thereby causing an oscillation relative to rotor oscillation.

Still referring to FIG. 4, system 400 includes an actuator 404, actuator 404 is configured to move the rotor. In various embodiments actuator 404 may be an electric motor. The electric motor may include a rotor shaft coupled to rotor, the electromagnetic force driving the turning of the rotor shaft and thereby turning the rotor back and forth to oscillate. In various embodiments, the electric motor is a voice coil motor. A voice coil motor may be configured to have a coil holder that actuates in and out of a permanent magnet linearly it is positioned within. The actuator of the voice coil motor may be coupled to a portion of rotor, thereby causing it to move at least partially through its path. In various embodiments, the actuator 404 may include at least one coil positioned within stator and external to a path travelled by each of the rotor magnets, each of the coils being electromagnetically coupled to at least one rotor magnet and configured to, upon energization of the coil, generate a magnetic field that causes the rotor to move. A coil may be an electromagnetic coil, a booster electromagnet, or a similar electromagnet configured to generate a varying magnetic field over time. In various embodiments including at least one coil, the coil may be disposed on CRM and configured to move rotor 108 in much the same manner as described herein.

The system 400 may include a stator that houses at least one electromagnetic coil. In various embodiments, the electromagnetic coils are disposed within a recess in the housing such that the electromagnetic coils are flush with an interior surface of the housing. In various embodiments, the electromagnetic coils include a plurality of coils. In various embodiments, when energized, the resulting magnetic field from the electromagnetic coils causes a magnetic force on the rotor magnets. In various embodiments, the magnetic force causes the rotor to move (e.g., translate, rotate, and/or oscillate). In various embodiments, the electromagnetic coils are positioned externally to a path travelled by the rotor magnets such that the rotor magnets and rotor arm do not contact the electromagnetic coils as the rotor oscillates.

In various embodiments, the electromagnetic coils include a plurality of coils through which a voltage is applied to generate a magnetic field. In various embodiments, each electromagnetic coil includes two or more adjacent sets of coils. In various embodiments, a voltage is applied to the electromagnetic coils to generate a magnetic field that drives oscillation of the rotor, and thereby drives oscillation of a payload there coupled. In various embodiments, a voltage is applied to the electromagnetic coils to generate a magnetic field that is used to control oscillation of a payload, such as payload 408. In various embodiments, the applied voltage is oscillated to generate an alternating magnetic field and exert magnetic force on the rotor magnets on the rotor. In various embodiments, the alternating magnetic field generated by the electromagnetic coils causes the rotor to oscillate at the resonant frequency of the system 400, oscillator assembly 100, or the rotor. In various embodiments, payload 408 may be driven by an external actuator (e.g., a voice coil actuator, electric motor, etc.).

Still referring to FIG. 4, a payload 408 may be coupled to the rotor. In various embodiments, the payload 408 is coupled to the rotor and moved by the rotation of rotor in an arcuate path, or rotate about an axis of rotation, at least. In various embodiments payload 408 may move, rotate, turn, spin, or oscillate along a different path than the rotor, in addition to said path, or instead thereof. In various embodiments, the payload is coupled to an axle of the externally-mounted actuator. In various embodiments, the payload is configured to rotate or oscillate about a different axis than the axle of an externally-mounted actuator. In various embodiments, the actuator is configured to move the payload between the first terminal point and the second terminal point. In various embodiments, the actuator is configured to rotationally move the payload and an angle of rotation of the rotor from the first terminal point to the second terminal point is equal to an angle of rotation of the payload. In various embodiments, the payload is configured to be moved by the actuator from the third terminal point to the fourth terminal point. In various embodiments, the actuator is configured to move the payload 408 an angle about the rotational axis equal to the angle between the third terminal point and the fourth terminal point. In various embodiments, an angle of rotation of the rotor from the first terminal point to the second terminal point is not equal to an angle of rotation of the payload 408. In various embodiments, an angle of rotation of the rotor from the third terminal point to the fourth terminal point is not equal to an angle of rotation of the payload 408. In various embodiments, the payload includes a mirror (e.g., a light deflector used in a LIDAR application). The light deflector (e.g., a mirror) rotates to steer at least one beam emitter by a light source (e.g., a laser) in order to scan a field of view (FOV). The payload 408 may be coupled to the rotor having at least one rotor magnet mounted thereon.

System 400 may include a controller (not shown for clarity). The controller may be configured for controlling motion (e.g., a velocity) of the rotor. In various embodiments, the controller may be configured to control actuator 404 which in turn controls the velocity of the rotor. In various embodiments, the controller includes proportional control. In various embodiments, the controller includes integral control. In various embodiments, the controller includes derivative control. In various embodiments, the controller receives as input motion data of the rotor (e.g., from a linear or rotational encoder). In various embodiments, the controller receives, as input, voltage data supplied to a motor. In various embodiments, the controller receives, as input, voltage data supplied to one or more electromagnets (e.g., rotor magnets, stator magnets, and/or electromagnetic coils). In various embodiments, the controller adjusts the speed of a motor and/or the voltages supplied to electromagnets (e.g., rotor electromagnets, stator electromagnets, and/or electromagnetic coils) based on the resonant frequency of the system, for example, if the resonant frequency of the system changes as the rotor oscillates. In various embodiments, the controller is configured to maintain the rotor oscillating at the inherent resonant frequency of the oscillatory system. In various embodiments, the electromagnetic coils 504 include an air core. In various embodiments, the electromagnetic coils include a magnetic core. In various embodiments, the magnetic core tunes the magnetic field (e.g., magnetic lines pass through the magnetic core and increase the magnetic strength).

In various embodiments, each electromagnet such as electromagnetic coil and/or actuator 404 is controlled with an H-bridge. In various embodiments, electromagnetic coils opposite (i.e., 180 degrees) one another operate in pairs. In various embodiments, electromagnetic coils opposite (i.e., 180 degrees) one another are controlled with the same H-bridge. In various embodiments, electromagnetic coils opposite (i.e., 180 degrees) one another are controlled with separate and synchronized H-bridges. For example, one set of electromagnetic coils may be controlled with one H-bridge and a second set of electromagnetic coils may be controlled with a different H-bridge. In various embodiments, electromagnetic coils opposite one another are equidistant from an axis (e.g., a rotational axis).

In various embodiments, the actuator 404 is controlled through the duty cycle. In various embodiments, the H-bridge has a free-running configuration, a positive voltage (+V) configuration, a negative voltage −V configuration, and a brake operation configuration. In various embodiments, the +V configuration generates a magnetic field that accelerates the rotor magnet in a first direction (e.g., clockwise). In various embodiments, the −V configuration generates a magnetic field that accelerates the rotor magnet in a second direction (e.g., counterclockwise). In various embodiments, in the free-running configuration, the booster electromagnet has no current passing through the coils and, thus, does not generate a magnetic field. In various embodiments, the brake operation configuration slows the rotor magnet. In the free-running configuration, all switches in the H-bridge are open (i.e., disconnected). In the brake operation configuration, the booster electromagnet is coupled to ground from both ends of the coil. In the +V configuration, a first end of the coil is coupled to a voltage at the common collector Vcc and a second end of the coil is coupled to ground. In the −V configuration, the first end of the coil is coupled to ground and the second end of the coil is coupled to the voltage at the common collector Vcc.

In various embodiments, the duty cycle switches between a positive voltage and negative voltage. In various embodiments, the duty cycle includes a square wave alternating between a positive voltage (+V) and a negative voltage (−V). In various embodiments, the duty cycle is adjusted by increasing or decreasing the amount of time that the positive and/or negative voltage is applied to the booster electromagnet. In various embodiments, the duty cycle is adjusted by allowing the electromagnetic coils to assume the free-running configuration. In various embodiments, the duty cycle is adjusted by allowing the electromagnetic coils to assume the brake operation configuration. In various embodiments, the positive and negative voltages may each be applied during windows of time that the rotor magnet is within an effective range (e.g., an effective range of angles) that is suitable to drive the rotor magnet with the magnetic field generated by the electromagnetic coils. In various embodiments, the magnitude of voltage in the +V and/or −V configurations may be increased or decreased to adjust the duty cycle of the electromagnetic coils. In various embodiments, the square wave may be continuous. In various embodiments, the square wave is an interrupted square wave (e.g., the electromagnetic coils assume a free-running configuration between each positive voltage and/or negative voltage component of the interrupted square wave). In various embodiments, the positive and/or negative voltage is applied for any suitable amount of time to thereby drive the rotor magnets (e.g., at the resonant frequency of the system). For example, the positive voltage and negative voltage may each be applied for an amount of time $dt_1$ in a continuous square wave. In various embodiments, $dt_1$ is any suitable amount of time such that the rotor magnets oscillate at the resonant frequency of the system. In another example, the positive voltage and negative voltage may each be applied for an amount of time $dt_2$ in an interrupted square wave where the electromagnetic coils are in the free-running configuration during the time dtf in between the positive and negative voltages. In various embodiments, $dt_2$ is less than $dt_1$. In various embodiments, $dt_2$ is greater than $dt_1$. In various embodiments, $dt_2$ is about equal to $dt_1$. In various embodiments, $dt_2$ is any suitable amount of time such that the rotor magnets oscillate at the resonant frequency of the system. In various embodiments, dtf is any suitable amount of time such that the rotor magnets oscillate at the resonant frequency of the system.

In various embodiments, where two or more sets of electromagnetic coils (electromagnetic coils such as coils 136a-b from FIG. 1 are acting as actuator 404) are included near the path of each rotor magnets, the duty cycles of each pair of coils 136 opposite one another are time-lagged by a predetermined amount of time (e.g., the amount of time for the rotor magnet(s) to exit the effective range of the first pair of electromagnetic coils and enter the effective range of the second pair of electromagnetic coils). In various embodiments, a middle of each square wave peak or valley corresponds to the time when the rotor magnet is closest in proximity to the respective electromagnet coil being driven.

Figures 6A, 6B:
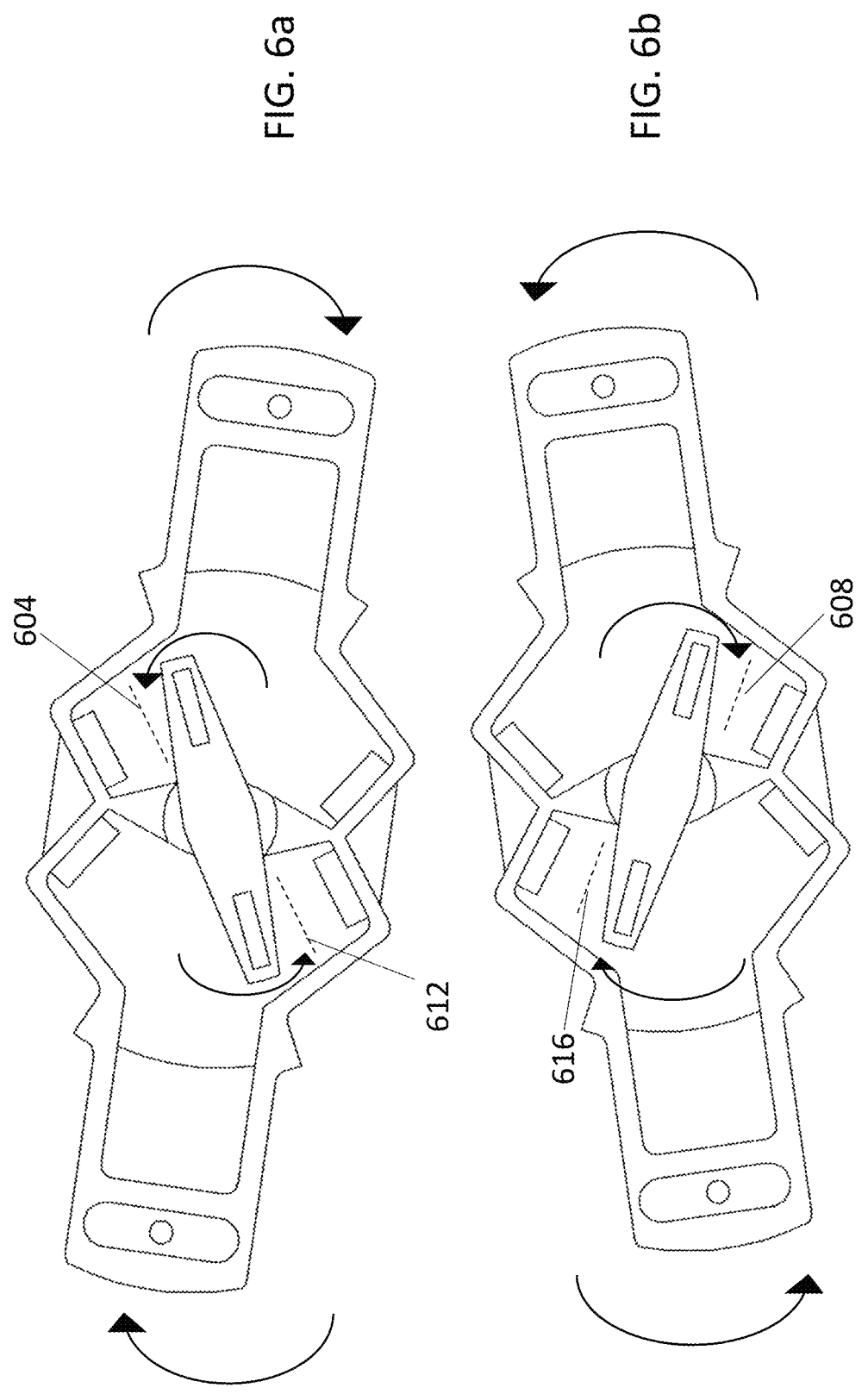
FIGS. 6*a-b* are planform views of a counter-rotating mass and rotor at various stages of oscillation.

Referring now to FIG. 5, a method 500 of oscillating a rotor at a resonant frequency is shown in flow diagram form. Method 500 includes, at step 505, providing the system, such as system 400 of FIG. 4, wherein the oscillator assembly 100 of FIG. 4 has a resonant frequency. The actuator, such as actuator 404 of FIG. 4 is configured to drive motion of a rotor, such as rotor 108 of FIG. 1. An actuator of the system is configured to drive (e.g., oscillate) the rotor at the resonant frequency. The resonant frequency may be the resonant frequency of the oscillator assembly 100 of FIG. 4. The resonant frequency may be the resonant frequency of system 400 of FIG. 4. The system 400 of FIG. 4 is configured to oscillate the counter-rotating mass in response to the rotor oscillation, as seen in FIGS. 6a-b. For clarity, in FIGS. 6a-b, the rotor arm is visible with the CRM and energy conversion elements (ECEs) mounted thereon. The actuator is removed and any payload coupled to the rotor which would obstruct this planform view is also removed. FIGS. 6a and 6b shows the oscillation of the CRM and the rotor at opposite peaks of oscillation at the first and third terminal point 604, 612 to the second and fourth terminal point 608, 616.

Still referring now to FIG. 5, method 500 includes, at step 510, energizing the actuator, thereby causing the rotor to oscillate between the first and second terminal points 604, 608 of FIGS. 6a-b, at the resonant frequency and in turn, causing the CRM to oscillate. In various embodiments, an actuator is configured to move the rotor of the assembly where the rotor is configured to be coupled to a payload. Energizing the actuator may include providing electrical energy to an electromagnet such as electromagnetic coil. In various embodiments, the actuator includes an electric motor. In various embodiments, the actuator includes at least one electromagnetic coil positioned external to a path travelled by each rotor magnet where the electromagnetic coil is electromagnetically coupled to the rotor magnet and is configured to, upon energizing, generate a magnetic field that causes the rotor to move. In various embodiments, the at least one electromagnetic coil is disposed within a housing of a stator such as the stator. In various embodiments, the actuator is coupled externally to the housing. In various embodiments, the actuator is a voice coil actuator.

Still referring now to FIG. 5, method 500 includes, at step 515, receiving a feedback signal at the controller. The controller may be a component of system 400 of FIG. 4. In various embodiments, the controller is configured to receive feedback from the actuator and/or an encoder (not pictured). In various embodiments, the controller receives motion data of the payload 408 or rotor (e.g., through a sensing device) and/or voltage data of the electromagnets such actuator 408. In various embodiments, the sensing device includes a linear encoder. In various embodiments, the sensing device includes a rotational encoder. In various embodiments, the sensing device includes an optical encoder. In various embodiments, the sensing device includes a magnetic encoder. In various embodiments, the sensing device includes a capacitive encoder.

Still referring to FIG. 5, method 500 includes, at step 520, providing a control signal to the actuator 408 in response to the feedback signal, thereby controlling the velocity of the rotor. In various embodiments, the controller is configured to receive feedback from the actuator 404 and/or an encoder (not pictured) and provide a control signal to the actuator to thereby control a velocity of the rotor. In various embodiments, the controller receives motion data of the payload 408 or the rotor (e.g., through a sensing device) and/or voltage data of the electromagnets such as actuator 404 and provides a control signal to thereby control a velocity of the payload. In various embodiments, the control signal is provided to an actuator. In various embodiments, the control signal is provided to a driver circuit configured to energize one or more electromagnets in the stator magnets, rotor magnets, and/or the electromagnetic coils. In various embodiments, the controller includes proportional control. In various embodiments, the controller includes integral control. In various embodiments, the controller includes derivative control. In various embodiments, the method includes determining whether the rotor is oscillating at the resonant frequency and, when the rotor is not oscillating at the resonant frequency, providing the control signal to the actuator to thereby reduce or increase the velocity of the rotor such that the rotor oscillates at the resonant frequency.

Figure 7:
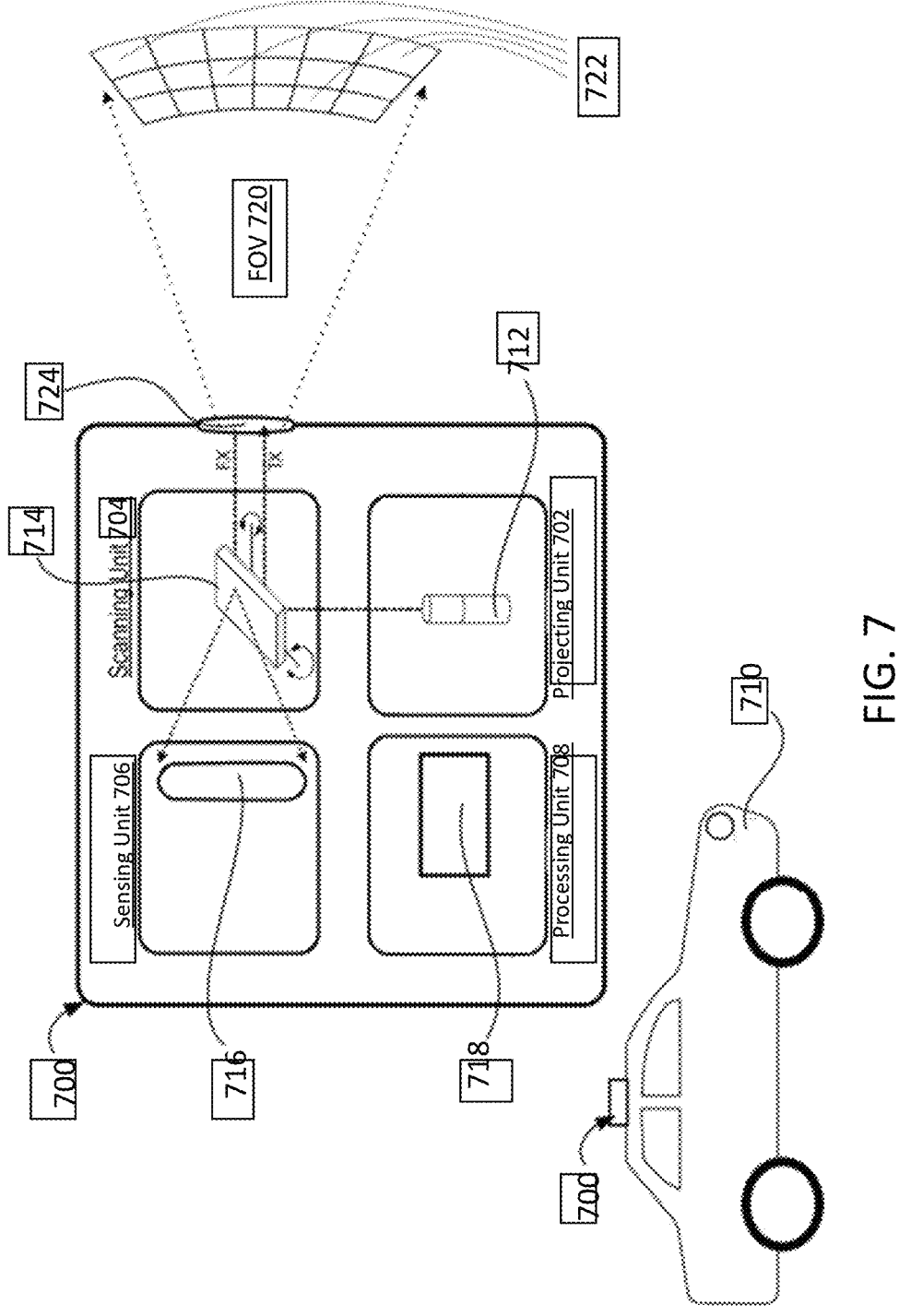
FIG. 7 is a LIDAR system which may be used with the oscillator assembly according to embodiments of the disclosed subject matter.

Referring now to FIG. 7, a LIDAR system 700 is shown in block diagram view. Disclosed embodiments may involve an optical system. As used herein, the term "optical system" includes any system that is used for the generation, detection and/or manipulation of light. By way of example only, an optical system may include one or more optical components for generating, detecting and/or manipulating light. For example, light sources, lenses, mirrors, prisms, beam splitters, collimators, polarizing optics, optical modulators, optical switches, optical amplifiers, optical detectors, optical sensors, fiber optics, semiconductor optic components, while each not necessarily required, may each be part of an optical system. In addition to the one or more optical components, an optical system may also include other non-optical components such as electrical components, mechanical components, chemical reaction components, and semiconductor components. The non-optical components may cooperate with optical components of the optical system. For example, the optical system may include at least one processor for analyzing detected light.

LIDAR System

Consistent with the present disclosure, the optical system may include a LIDAR system or may be included as a portion of a LIDAR system. As used herein, the term "LIDAR system" includes any system which can determine values of parameters indicative of a distance between a pair of tangible objects based on reflected light. In one embodiment, the LIDAR system may determine a distance between a pair of tangible objects based on reflections of light emitted by the LIDAR system. As used herein, the term "determine distances" includes generating outputs which are indicative of distances between pairs of tangible objects. The determined distances may represent physical dimensions between a pair of tangible objects. By way of example only, the determined distances may include a line of flight distance between the LIDAR system and another tangible object in a field of view of the LIDAR system. In another embodiment, the LIDAR system may determine the relative velocity between a pair of tangible objects based on reflections of light emitted by the LIDAR system. Examples of outputs indicative of the distance between a pair of tangible objects include: a number of standard length units between the tangible objects (e.g. number of meters, number of inches, number of kilometers, number of millimeters), a number of arbitrary length units (e.g. number of LIDAR system lengths), a ratio between the distance to another length (e.g. a ratio to a length of an object detected in a field of view of the LIDAR system), an amount of time (e.g. given as standard unit, arbitrary units or ratio, for example, the time it takes light to travel between the tangible objects), one or more locations (e.g. specified using an agreed coordinate system, specified in relation to a known location), and more.

Scanning

Consistent with the present disclosure, a LIDAR system may be configured to detect objects by scanning the environment of the LIDAR system. The term "scanning the environment of the LIDAR system" includes illuminating the field of view or a portion of the field of view of the LIDAR system. In one example, scanning the environment of the LIDAR system may be achieved by moving or pivoting a light deflector to deflect light in differing directions toward different parts of the field of view. In another example, scanning the environment of the LIDAR system may be achieved by changing a position (i.e., location and/or orientation) of a sensor with respect to the field of view. In another example, scanning the environment of the LIDAR system may be achieved by changing a position (i.e., location and/or orientation) of a light source with respect to the field of view. In yet another example, scanning the environment of LIDAR system may be achieved by changing the positions of at least one light source and of at least one sensor to move rigidly with respect to the field of view (i.e., the relative distance and orientation of the at least one sensor and of the at least one light source remains).

FOV

As used herein the term "field of view of the LIDAR system" may include an extent of the observable environment of the LIDAR system in which objects may be detected. It is noted that the field of view (FOV) of the LIDAR system may be affected by various conditions such as but not limited to: an orientation of the LIDAR system (e.g. is the direction of an optical axis of the LIDAR system); a position of the LIDAR system with respect to the environment (e.g. distance above ground and adjacent topography and obstacles); operational parameters of the LIDAR system (e.g. emission power, computational settings, defined angles of operation), etc. The field of view of LIDAR system may be defined, for example, by a solid angle (e.g., defined using $\phi$, $\theta$ angles, in which $\phi$ and $\theta$ are angles defined in perpendicular planes, e.g. with respect to symmetry axes of the LIDAR system and/or its FOV). In one example, the field of view may also be defined within a certain range (e.g., up to 200 m).

The term "instantaneous field of view" may include an extent of the observable environment in which objects may be detected by the LIDAR system at any given moment. For example, for a scanning LIDAR system, the instantaneous field of view is narrower than the entire FOV of the LIDAR system, and it can be moved within the FOV of the LIDAR system in order to enable detection in other parts of the FOV of the LIDAR system. The movement of the instantaneous field of view within the FOV of the LIDAR system may be achieved by moving a light deflector of the LIDAR system (or external to the LIDAR system), so as to deflect beams of light to and/or from the LIDAR system in differing directions. In one embodiment, the LIDAR system may be configured to scan scene in the environment in which the LIDAR system is operating. As used herein the term "scene" may include some or all of the objects within the field of view of the LIDAR system, in their relative positions and in their current states, within an operational duration of the LIDAR system. For example, the scene may include ground elements (e.g., earth, roads, grass, sidewalks, road surface marking), sky, man-made objects (e.g., vehicles, buildings, signs), vegetation, people, animals, light projecting elements (e.g. flashlights, sun, other LIDAR systems), and so on.

Light Source

Consistent with disclosed embodiments, the LIDAR system may include at least one projecting unit with a light source configured to project light. As used herein the term "light source" refers to any device configured to emit light. In one embodiment, the light source may be a laser such as a solid-state laser, laser diode, a high-power laser, or an alternative light source such as, a light emitting diode (LED)-based light source. In addition, light source 712 as illustrated throughout the figures, may emit light in differing formats, such as light pulses, continuous wave (CW), quasi-CW, and so on. For example, one type of light source that may be used is a vertical-cavity surface-emitting laser (VCSEL). Another type of light source that may be used is an external cavity diode laser (ECDL). In some examples, the light source may include a laser diode configured to emit light at a wavelength between about 650 nm and 1150 nm. Alternatively, the light source may include a laser diode configured to emit light at a wavelength between about 800 nm and about 7000 nm, between about 850 nm and about 950 nm, or between about 1300 nm and about 1600 nm. Unless indicated otherwise, the term "about" with regards to a numeric value is defined as a variance of up to 5% with respect to the stated value.

Light Deflector

Consistent with disclosed embodiments, the LIDAR system may include at least one scanning unit with at least one light deflector configured to deflect light from the light source in order to scan the field of view. The term "light deflector" includes any mechanism or module which is configured to make light deviate from its original path; for example, a mirror, a prism, controllable lens, a mechanical mirror, mechanical scanning polygons, active diffraction (e.g. controllable LCD), Risley prisms, non-mechanical-electro-optical beam steering (such as made by Vscent), polarization grating (such as offered by Boulder Non-Linear Systems), optical phased array (OPA), and more. In one embodiment, a light deflector may include a plurality of optical components, such as at least one reflecting element (e.g., a mirror), at least one refracting element (e.g., a prism, a lens), and so on. In one example, the light deflector may be movable, to cause light to deviate to differing degrees (e.g., discrete degrees, or over a continuous span of degrees). The light deflector may optionally be controllable in different ways (e.g., deflect to a degree a, change deflection angle by Aa, move a component of the light deflector by M millimeters, change speed in which the deflection angle changes). In addition, the light deflector may optionally be operable to change an angle of deflection within a single plane (e.g., θ coordinate). The light deflector may optionally be operable to change an angle of deflection within two non-parallel planes (e.g., θ and φ coordinates). Alternatively, or in additionally, the light deflector may optionally be operable to change an angle of deflection between predetermined settings (e.g. along a predefined scanning route) or otherwise. With respect to the use of light deflectors in LIDAR systems, it is noted that a light deflector may be used in the outbound direction (also referred to as transmission direction, or TX) to deflect light from the light source to at least a part of the field of view. However, a light deflector may also be used in the inbound direction (also referred to as reception direction, or RX) to deflect light from at least a part of the field of view to one or more light sensors.

Disclosed embodiments may involve pivoting the light deflector in order to scan the field of view. As used herein the term "pivoting" includes rotating of an object (especially a solid object) about one or more axis of rotation, while substantially maintaining a center of rotation fixed. In one embodiment, the pivoting of the light deflector may include rotation of the light deflector about a fixed axis (e.g., a shaft), but this is not necessarily so. For example, in some MEMS mirror implementation, the MEMS mirror may move by actuation of a plurality of benders connected to the mirror, the mirror may experience some spatial translation in addition to rotation. Nevertheless, such mirror may be designed to rotate about a substantially fixed axis, and therefore consistent with the present disclosure it considered to be pivoted. In other embodiments, some types of light deflectors (e.g., non-mechanical-electro-optical beam steering, OPA) do not require any moving components or internal movements in order to change the deflection angles of deflected light. It is noted that any discussion relating to moving or pivoting a light deflector is also mutatis mutandis applicable to controlling the light deflector such that it changes a deflection behavior of the light deflector. For example, controlling the light deflector may cause a change in a deflection angle of beams of light arriving from at least one direction.

Disclosed embodiments may involve receiving reflections associated with a portion of the field of view corresponding to a single instantaneous position of the light deflector. As used herein, the term "instantaneous position of the light deflector" (also referred to as "state of the light deflector") refers to the location or position in space where at least one controlled component of the light deflector is situated at an instantaneous point in time, or over a short span of time. In one embodiment, the instantaneous position of the light deflector may be gauged with respect to a frame of reference. The frame of reference may pertain to at least one fixed point in the LIDAR system. Or, for example, the frame of reference may pertain to at least one fixed point in the scene. In some embodiments, the instantaneous position of the light deflector may include some movement of one or more components of the light deflector (e.g., mirror, prism), usually to a limited degree with respect to the maximal degree of change during a scanning of the field of view. For example, a scanning of the entire field of view of the LIDAR system may include changing deflection of light over a span of 30°, and the instantaneous position of the at least one light deflector may include angular shifts of the light deflector within 0.05°. In other embodiments, the term "instantaneous position of the light deflector" may refer to the positions of the light deflector during acquisition of light which is processed to provide data for a single point of a point cloud (or another type of 3D model) generated by the LIDAR system. In some embodiments, an instantaneous position of the light deflector may correspond with a fixed position or orientation in which the deflector pauses for a short time during illumination of a particular sub-region of the LIDAR field of view. In other cases, an instantaneous position of the light deflector may correspond with a certain position/ orientation along a scanned range of positions/orientations of the light deflector that the light deflector passes through as part of a continuous or semi-continuous scan of the LIDAR field of view. In some embodiments, the light deflector may be moved such that during a scanning cycle of the LIDAR FOV the light deflector is located at a plurality of different instantaneous positions. In other words, during the period of time in which a scanning cycle occurs, the deflector may be moved through a series of different instantaneous positions/orientations, and the deflector may reach each different instantaneous position/orientation at a different time during the scanning cycle.

Sensor

Consistent with disclosed embodiments, the LIDAR system may include at least one sensing unit with at least one sensor configured to detect reflections from objects in the field of view. The term "sensor" includes any device, element, or system capable of measuring properties (e.g., power, frequency, phase, pulse timing, pulse duration) of electromagnetic waves and to generate an output relating to the measured properties. In some embodiments, the at least one sensor may include a plurality of detectors constructed from a plurality of detecting elements. The at least one sensor may include light sensors of one or more types. It is noted that the at least one sensor may include multiple sensors of the same type which may differ in other characteristics (e.g., sensitivity, size). Other types of sensors may also be used. Combinations of several types of sensors can be used for different reasons, such as improving detection over a span of ranges (especially in close range); improving the dynamic range of the sensor; improving the temporal response of the sensor; and improving detection in varying environmental conditions (e.g. atmospheric temperature, rain, etc.).

In one embodiment, the at least one sensor includes a SiPM (Silicon photomultipliers) which is a solid-state single-photon-sensitive device built from an array of avalanche photodiode (APD), single photon avalanche diode (SPAD), serving as detection elements on a common silicon substrate. In one example, a typical distance between SPADs may be between about 10 μm and about 50 μm, wherein each SPAD may have a recovery time of between about 20 ns and about 700 ns. Similar photomultipliers from other, non-silicon materials may also be used. Although a SiPM device works in digital/switching mode, the SiPM is an analog device because all the microcells may be read in parallel, making it possible to generate signals within a dynamic range from a single photon to hundreds and thousands of photons detected by the different SPADs. It is noted that outputs from different types of sensors (e.g., SPAD, APD, SiPM, PIN diode, Photodetector) may be combined together to a single output which may be processed by a processor of the LIDAR system.

LIDAR System

Consistent with the present disclosure, the optical system may include a LIDAR system or may be included as a portion of a LIDAR system. As used herein, the term "LIDAR system" includes any system which can determine values of parameters indicative of a distance between a pair of tangible objects based on reflected light. In one embodiment, the LIDAR system may determine a distance between a pair of tangible objects based on reflections of light emitted by the LIDAR system. As used herein, the term "determine distances" includes generating outputs which are indicative of distances between pairs of tangible objects. The determined distances may represent physical dimensions between a pair of tangible objects. By way of example only, the determined distances may include a line of flight distance between the LIDAR system and another tangible object in a field of view of the LIDAR system. In another embodiment, the LIDAR system may determine the relative velocity between a pair of tangible objects based on reflections of light emitted by the LIDAR system. Examples of outputs indicative of the distance between a pair of tangible objects include: a number of standard length units between the tangible objects (e.g. number of meters, number of inches, number of kilometers, number of millimeters), a number of arbitrary length units (e.g. number of LIDAR system lengths), a ratio between the distance to another length (e.g. a ratio to a length of an object detected in a field of view of the LIDAR system), an amount of time (e.g. given as standard unit, arbitrary units or ratio, for example, the time it takes light to travel between the tangible objects), one or more locations (e.g. specified using an agreed coordinate system, specified in relation to a known location), and more.

System Overview

FIG. 1A illustrates a LIDAR system 700 including a projecting unit 702, a scanning unit 704, a sensing unit 706, and a processing unit 708. LIDAR system 700 may be mountable on a vehicle 710. Consistent with embodiments of the present disclosure, projecting unit 702 may include at least one light source 712, scanning unit 704 may include at least one light deflector 714, sensing unit 706 may include at least one sensor 716, and processing unit 708 may include at least one processor 718. In one embodiment, at least one processor 718 may be configured to coordinate operation of the at least one light source 712 with the movement of at least one light deflector 714 to scan a field of view 720. During a scanning cycle, each instantaneous position of at least one light deflector 714 may be associated with a particular portion 722 of field of view 720. In addition, LIDAR system 700 may include at least one optional optical window 724 for directing light projected towards field of view 720 and/or receiving light reflected from objects in field of view 720. Optional optical window 724 may serve different purposes, such as collimation of the projected light and focusing of the reflected light. In one embodiment, optional optical window 724 may be an opening, a flat window, a lens, or any other type of optical window.

Consistent with the present disclosure, LIDAR system 700 may be used in autonomous or semi-autonomous road-vehicles (for example, cars, buses, vans, trucks and any other terrestrial vehicle). Autonomous road-vehicles with LIDAR system 700 may scan their environment and drive to a destination without human input. Similarly, LIDAR system 700 may also be used in autonomous/semi-autonomous aerial-vehicles (for example, UAV, drones, quadcopters, and any other airborne vehicle or device); or in an autonomous or semi-autonomous water vessel (e.g., boat, ship, submarine, or any other watercraft). Autonomous aerial-vehicles and watercraft with LIDAR system 700 may scan their environment and navigate to a destination autonomously or using a remote human operator. According to one embodiment, vehicle 710 (either a road-vehicle, aerial-vehicle, or watercraft) may use LIDAR system 700 to aid in detecting and scanning the environment in which vehicle 710 is operating.

It should be noted that LIDAR system 700 or any of its components may be used together with any of the example embodiments and methods disclosed herein. Further, while some aspects of LIDAR system 700 are described relative to an exemplary vehicle-based LIDAR platform, LIDAR system 700, any of its components, or any of the processes described herein may be applicable to LIDAR systems of other platform types.

In some embodiments, LIDAR system 700 may include one or more scanning units 704 to scan the environment around vehicle 710. LIDAR system 700 may be attached or mounted to any part of vehicle 710. Sensing unit 706 may receive reflections from the surroundings of vehicle 710, and transfer reflection signals indicative of light reflected from objects in field of view 720 to processing unit 708. Consistent with the present disclosure, scanning units 704 may be mounted to or incorporated into a bumper, a fender, a side panel, a spoiler, a roof, a headlight assembly, a taillight assembly, a rear-view mirror assembly, a hood, a trunk or any other suitable part of vehicle 710 capable of housing at least a portion of the LIDAR system. In some cases, LIDAR system 700 may capture a complete surround view of the environment of vehicle 710. Thus, LIDAR system 700 may have a 360-degree horizontal field of view. In one example, as shown in FIG. 1A, LIDAR system 700 may include a single scanning unit 704 mounted on a roof of vehicle 710. Alternatively, LIDAR system 700 may include multiple scanning units (e.g., two, three, four, or more scanning units 704) each with a field of few such that in the aggregate the horizontal field of view is covered by a 360-degree scan around vehicle 710. One skilled in the art will appreciate that LIDAR system 700 may include any number of scanning units 704 arranged in any manner, each with an 80° to 720° field of view or less, depending on the number of units employed. Moreover, a 360-degree horizontal field of view may be also obtained by mounting multiple LIDAR systems 700 on vehicle 710, each with a single scanning unit 704. However, that the one or more LIDAR systems 700 do not have to provide a complete 360° field of view, and that narrower fields of view may be useful in some situations. For example, vehicle 710 may require a first LIDAR system 700 having a field of view of 75° looking ahead of the vehicle, and possibly a second LIDAR system 700 with a similar FOV looking backward (optionally with a lower detection range). It is also noted that different vertical field of view angles may also be implemented.

Accordingly, in a first example embodiment, the present invention is an oscillator assembly. In a $1^{st}$ aspect of the $1^{st}$ example embodiment, the assembly comprises: a stator; a rotor configured to move with one degree of freedom relative to the stator. The rotor further comprises: at least one rotor magnet disposed on the rotor, wherein the at least one rotor magnet is configured to move with the rotor between a first terminal point and a second terminal point; a counter-rotating mass (CRM) rotatably and elastically mounted on the stator, wherein the rotor is rotatably mounted on the CRM, the CRM configured to move with one degree of freedom relative to the stator and the rotor. The CRM further comprises: at least a first energy conversion element (ECE) disposed on the CRM, wherein the first ECE is configured to transfer torque from the rotor to the CRM, thereby causing rotation of the CRM; and at least a second ECE disposed on the CRM, wherein the second ECE is configured to transfer torque from the rotor to the CRM, thereby causing rotation of the CRM.

In a $2^{nd}$ aspect of the $1^{st}$ example embodiment, the assembly further comprises at least a second rotor magnet disposed on the rotor, wherein the second rotor magnet is configured to move with the rotor between a third terminal point and a fourth terminal point. The remainder of features and example features of the $2^{nd}$ aspect are as they described above with respect to the $1^{st}$ aspect of the $1^{st}$ example embodiment.

In a 3rd aspect of the $1^{st}$ example embodiment, the CRM further comprises at least a third and a fourth energy conversion elements (ECEs) disposed thereon, the third ECE configured to transfer torque from the rotor to the CRM, and the fourth ECE configured to transfer torque from the rotor to the CRM. The remainder of features and example features of the $3^{rd}$ aspect are as they described above with respect to any of the $1^{st}$ and $2^{nd}$ aspects of the $1^{st}$ example embodiment.

In a $4^{th}$ aspect of the $1^{st}$ example embodiment, each of the at least first and second ECE comprises a spring, the spring configured to transfer torque from the rotor to the CRM. The remainder of features and example features of the $4^{th}$ aspect are as they described above with respect to any of the $1^{st}$ through $3^{rd}$ aspects of the $1^{st}$ example embodiment.

In a $5^{th}$ aspect of the $1^{st}$ example embodiment, each of the at least first and second energy conversion elements comprises a magnet. The remainder of features and example features of the $5^{th}$ aspect are as they described above with respect to the $1^{st}$ through $4^{th}$ aspects of the $1^{st}$ example embodiment.

In a $6^{th}$ aspect of the $1^{st}$ example embodiment, the at least one rotor magnet is magnetically coupled to each of the at least first and second ECEs, the at least one rotor magnet generating a magnetic field that repels each of the magnets of the first and second ECEs, thereby causing the at least first and second ECEs to move the CRM. The remainder of features and example features of the $6^{th}$ aspect are as they described above with respect to any of the $1^{st}$ through $5^{th}$ aspects of the $1^{st}$ example embodiment.

In a $7^{th}$ aspect of the $1^{st}$ example embodiment, the CRM is configured to rotationally oscillate relative to the stator. The remainder of features and example features of the $7^{th}$ aspect are as they described above with respect to any of the $1^{st}$ through $6^{th}$ aspects of the $1^{st}$ example embodiment.

In an $8^{th}$ aspect of the $1^{st}$ example embodiment, the CRM is elastically mounted on the stator by at least one bearing. The remainder of features and example features of the $8^{th}$ aspect are as they described above with respect to any of the $1^{st}$ through $7^{th}$ aspects of the $1^{st}$ example embodiment.

In a $9^{th}$ aspect of the $1^{st}$ example embodiment, the at least one bearing is a flexure. The remainder of features and example features of the $9^{th}$ aspect are as they described above with respect to any of the $1^{st}$ through $8^{th}$ aspects of the $1^{st}$ example embodiment.

In a $10^{th}$ aspect of the $1^{st}$ example embodiment, each rotor magnet comprises a permanent magnet. The remainder of features and example features of the $10^{th}$ aspect are as they described above with respect to any of the $1^{st}$ through $9^{th}$ aspects of the $1^{st}$ example embodiment.

In a $11^{th}$ aspect of the $1^{st}$ example embodiment, the rotor and the CRM each have a moment of inertia, and wherein the moment of inertia of the CRM is at least 180 times greater than the moment of inertia of the rotor. The remainder of features and example features of the $11^{th}$ aspect are as they described above with respect to any of the $1^{st}$ through $10^{th}$ aspects of the $1^{st}$ example embodiment.

In a $12^{th}$ aspect of the $1^{st}$ example embodiment, the rotor is coupled to a payload. The remainder of features and example features of the $12^{th}$ aspect are as they described above with respect to any of the $1^{st}$ through $11^{th}$ aspects of the $1^{st}$ example embodiment.

In a $13^{th}$ aspect of the $1^{st}$ example embodiment, the payload is a mirror. The remainder of features and example features of the $13^{th}$ aspect are as they described above with respect to any of the $1^{st}$ through $12^{th}$ aspects of the $1^{st}$ example embodiment.

In a $2^{nd}$ example embodiment, the present invention is a system. In a $1^{st}$ aspect of the $2^{nd}$ example embodiment, the system comprises any of the oscillator assemblies according to any aspect of the P t example embodiment and an actuator coupled to the rotor, the actuator configured to move the rotor.

In a $2^{nd}$ aspect of the $2^{nd}$ example embodiment, the actuator is an electric motor. The remainder of features and example features of the $2^{nd}$ aspect are as they described above with respect to the $1^{st}$ aspect of the $2^{nd}$ example embodiment.

In a $3^{rd}$ aspect of the $2^{nd}$ example embodiment, the electric motor is a voice-coil motor. The remainder of features and example features of the $3^{rd}$ aspect are as they described above with respect to the $1^{st}$ and $2^{nd}$ aspects of the $2^{nd}$ example embodiment.

In a $4^{th}$ aspect of the $2^{nd}$ example embodiment, the actuator comprises at least one coil positioned within the stator and external to a path travelled by each of the rotor magnets, wherein the at least one coil is electromagnetically coupled to the at least one rotor magnet and is configured to, upon energizing, generate a magnetic field that causes the rotor to move. The remainder of features and example features of the $4^{th}$ aspect are as they described above with respect to any of the $1^{st}$ through $3^{rd}$ aspects of the $2^{nd}$ example embodiment.

In a $5^{th}$ aspect of the $2^{nd}$ example embodiment, the system further comprises a controller configured to receive a feedback signal and provide a control signal to the actuator to thereby control a velocity of the rotor. The remainder of features and example features of the $5^{th}$ aspect are as they described above with respect to any of the $1^{st}$ through $4^{th}$ aspects of the $2^{nd}$ example embodiment.

In a third example embodiment, the present invention is an oscillatory assembly. In a $1^{st}$ aspect of the $3^{rd}$ example embodiment, the oscillatory assembly comprises: a stator; a rotor configured to move with one degree of freedom relative to the stator; a counter-rotating mass (CRM) elastically and rotatably mounted on the stator, wherein the rotor is rotatably mounted on the CRM, the CRM configured to rotationally oscillate relative to the stator and to rotate with one degree of freedom relative to the stator and the rotor. The rotor comprises at least a first rotor magnet and a second rotor magnet, each mounted on the rotor, the first rotor magnet configured to move with the rotor between a first terminal point and a second terminal point, the second rotor magnet configured to move with the rotor between a third terminal point and a fourth terminal point; the CRM comprises at least a first, a second, a third and a fourth torque transfer magnets disposed on the CRM proximal to the first, second, third, and fourth terminal points of the rotor, respectively, each torque transfer magnet generating a magnetic field configured to repel the rotor magnets; the first rotor magnet is magnetically coupled to the first and second torque transfer magnets, and the second rotor magnet is magnetically coupled to the third and fourth torque transfer magnets, the first rotor magnet generating a magnetic field that causes the first and second torque transfer magnets to move the CRM, and the second rotor magnet generating a magnetic field that causes the third and the fourth torque transfer magnets to move the CRM. The stator comprises at least one coil positioned external to a path travelled by each of the rotor magnets, wherein the at least one coil is electromagnetically coupled to the rotor magnets and is configured to, upon energizing, generate a magnetic field that causes the rotor to move.

In a $2^{nd}$ aspect of the $3^{rd}$ example embodiment, the rotor and the CRM each have a moment of inertia, and wherein the moment of inertia of the CRM is at least 180 times greater than the moment of inertia of the rotor. The remainder of features and example features of the $2^{nd}$ aspect are as they described above with respect to the $1^{st}$ aspect of the $3^{rd}$ example embodiment.

In a $3^{rd}$ aspect of the $3^{rd}$ example embodiment, the CRM further comprises a first terminus, a second terminus, and a central portion disposed between the first and the second termini, the central portion having a cutout therethrough, wherein the rotor is disposed within the cutout, the rotor and the CRM being coaxially disposed. The remainder of features and example features of the $3^{rd}$ aspect are as they described above with respect to any of the $1^{st}$ and $2^{nd}$ aspects of the $3^{rd}$ example embodiment.

In a $4^{th}$ aspect of the $3^{rd}$ example embodiment, the CRM is elastically mounted on the stator by at least one flexure. The remainder of features and example features of the $4^{th}$ aspect are as they described above with respect to any of the $1^{st}$ through $3^{rd}$ aspects of the $3^{rd}$ example embodiment.

In a $5^{th}$ aspect of the $3^{rd}$ example embodiment, the CRM is elastically mounted on the stator by four flexures. The remainder of features and example features of the $5^{th}$ aspect are as they described above with respect to any of the $1^{st}$ through $4^{th}$ aspects of the $3^{rd}$ example embodiment.

In a fourth example embodiment, the present invention is a method of oscillating a rotor at a resonant frequency. In a $1^{st}$ aspect of the $4^{th}$ example embodiment, the method comprises: providing the system as described above with respect to the $2^{nd}$ example embodiment and any one of its aspects, wherein the assembly is an oscillator comprising a resonant frequency, and wherein the actuator is configured to drive motion of the rotor at the resonant frequency and wherein the counter rotating mass is configured to oscillate in response to the oscillation of the rotor; and energizing the actuator, thereby causing the rotor and the counter rotating mass to oscillate between the first and second terminal points at the resonant frequency.

In a $2^{nd}$ aspect of the $4^{th}$ example embodiment, the system further comprises a controller, wherein the method further comprises receiving a feedback signal at the controller; and providing a control signal to the actuator to thereby control a velocity of the rotor. The remainder of features and example features of the $2^{nd}$ aspect are as they described above with respect to the $1^{st}$ aspect of the $4^{th}$ example embodiment.

In a fifth example embodiment, the present invention is an LIDAR scanning assembly. In a $1^{st}$ aspect of the $5^{rd}$ example embodiment, the system comprises: a light source configured to generate at least one light beam, an oscillator assembly, the oscillator assembly a stator; a rotor configured to move with one degree of freedom relative to the stator. The rotor further comprises: at least one rotor magnet disposed on the rotor, wherein the at least one rotor magnet is configured to move with the rotor between a first terminal point and a second terminal point; a counter-rotating mass (CRM) rotatably and elastically mounted on the stator, wherein the rotor is rotatably mounted on the CRM, the CRM configured to move with one degree of freedom relative to the stator and the rotor. The CRM further comprises: at least a first energy conversion element (ECE) disposed on the CRM, wherein the first ECE is configured to transfer torque from the rotor to the CRM, thereby causing rotation of the CRM; and at least a second ECE disposed on the CRM, wherein the second ECE is configured to transfer torque from the rotor to the CRM, thereby causing rotation of the CRM. The system comprises a light deflector coupled to the rotor, a first actuator coupled to the rotor, the first actuator configured to rotate the light deflector about a first scan axis, a second actuator configured to rotate the light deflector about a second scan axis, the light deflector configured to deflect the at least on light beam to a field of view (FOV), at least one processor configured to control the light source, the first and the second actuator to cause the light deflector to scan the FOV.

In a $2^{nd}$ aspect of the $5^{th}$ example embodiment, LIDAR scanning system further comprises at least one sensor configured to detect the at least one light beam reflected from an object located in the field of view, and wherein the at least one processor is configured to: receive, from the at least one sensor, a reflection signal indicative of the at least one light beam reflected from the object; and based on the reflection signal, generate a point-cloud representation of an environment of the system within the at least a portion of the field of view. The remainder of features and example features of the $2^{nd}$ aspect are as they described above with respect to any of the $1^{st}$ aspect of the $5^{th}$ example embodiment.

In a $3^{rd}$ aspect of the $5^{th}$ example embodiment, the first scanning axis and the second scanning axis are perpendicular to each other. The remainder of features and example features of the $3^{rd}$ aspect are as they described above with respect to any of the $1^{st}$ through $2^{nd}$ aspects of the $5^{th}$ example embodiment.

In a $4^{th}$ aspect of the $5^{th}$ example embodiment, the assembly further comprises at least a second rotor magnet disposed on the rotor, wherein the second rotor magnet is configured to move with the rotor between a third terminal point and a fourth terminal point. The remainder of features and example features of the $4^{th}$ aspect are as they described above with respect to any of the $1^{st}$ through $3^{rd}$ aspects of the $5^{th}$ example embodiment.

In a $5^{th}$ aspect of the $5^{th}$ embodiment, the CRM further comprises at least a third and a fourth energy conversion elements (ECEs) disposed thereon, the third ECE configured to transfer torque from the rotor to the CRM, and the fourth ECE configured to transfer torque from the rotor to the CRM. The remainder of features and example features of the $5^{th}$ aspect are as they described above with respect to any of the $1^{st}$ through $4^{th}$ aspects of the $5^{th}$ example embodiment.

In a $6^{th}$ aspect of the $5^{th}$ embodiment, each of the at least first and second ECE comprises a spring, the spring configured to transfer torque from the rotor to the CRM. The remainder of features and example features of the $5^{th}$ aspect are as they described above with respect to any of the $1^{st}$ through $5^{th}$ aspects of the $5^{th}$ example embodiment.

In a $7^{th}$ aspect of the $5^{th}$ example embodiment, each of the at least first and second energy conversion elements comprises a magnet. The remainder of features and example features of the $7^{th}$ aspect are as they described above with respect to the $1^{st}$ through $6^{th}$ aspects of the $5^{th}$ example embodiment.

In an $8^{th}$ aspect of the $5^{th}$ example embodiment, the at least one rotor magnet is magnetically coupled to each of the at least first and second ECEs, the at least one rotor magnet generating a magnetic field that repels each of the magnets of the first and second ECEs, thereby causing the at least first and second ECEs to move the CRM. The remainder of features and example features of the $8^{th}$ aspect are as they described above with respect to any of the the $1^{st}$ through $7^{th}$ aspects of the $5^{th}$ example embodiment.

In a $9^{th}$ aspect of the $5^{th}$ example embodiment, the CRM is configured to rotationally oscillate relative to the stator. The remainder of features and example features of the $9^{th}$ aspect are as they described above with respect to any of the $1^{st}$ through $8^{th}$ aspects of the $5^{th}$ example embodiment.

In a $10^{th}$ aspect of the $5^{th}$ example embodiment, the CRM is elastically mounted on the stator by at least one bearing. The remainder of features and example features of the $10^{th}$ aspect are as they described above with respect to any of the $1^{st}$ through $9^{th}$ aspects of the $5^{th}$ example embodiment.

In a $11^{th}$ aspect of the $5^{th}$ example embodiment, the at least one bearing is a flexure. The remainder of features and example features of the $11^{th}$ aspect are as they described above with respect to any of the $1^{st}$ through $10^{th}$ aspects of the $5^{th}$ example embodiment.

In a $12^{th}$ aspect of the $5^{th}$ example embodiment, each rotor magnet comprises a permanent magnet. The remainder of features and example features of the $12^{th}$ aspect are as they described above with respect to any of the $1^{st}$ through $11^{th}$ aspects of the $5^{th}$ example embodiment.

In a $13^{th}$ aspect of the $5^{th}$ example embodiment, the rotor and the CRM each have a moment of inertia, and wherein the moment of inertia of the CRM is at least 180 times greater than the moment of inertia of the rotor. The remainder of features and example features of the $13^{th}$ aspect are as they described above with respect to any of the $1^{st}$ through $12^{th}$ aspects of the $5^{th}$ example embodiment.

In a $14^{th}$ aspect of the $5^{th}$ example embodiment, the first and/or the second actuator is an electric motor. The remainder of features and example features of the $14^{th}$ aspect are as they described above with respect to any of the $1^{st}$ through $13^{th}$ aspects of the $5^{th}$ example embodiment.

In a $15^{th}$ aspect of the $5^{th}$ example embodiment, the electric motor is a voice-coil motor. The remainder of features and example features of the $15^{th}$ aspect are as they described above with respect to any of the $1^{st}$ through $14^{th}$ aspects of the $5^{th}$ example embodiment.

In a $16^{th}$ aspect of the $5^{th}$ example embodiment, the first actuator comprises at least one coil positioned within the stator and external to a path travelled by each of the rotor magnets, wherein the at least one coil is electromagnetically coupled to the at least one rotor magnet and is configured to, upon energizing, generate a magnetic field that causes the rotor to move. The remainder of features and example features of the $16^{th}$ aspect are as they described above with respect to any of the $1^{st}$ through $15^{th}$ aspects of the $5^{th}$ example embodiment.

In a $17^{th}$ aspect of the $5^{th}$ example embodiment, the system further comprises a controller configured to receive a feedback signal and provide a control signal to the first actuator to thereby control a velocity of the rotor. The remainder of features and example features of the $17^{th}$ aspect are as they described above with respect to any of the $1^{st}$ through $16^{th}$ aspects of the $5^{th}$ example embodiment.

While the disclosed subject matter is described herein in terms of certain preferred embodiments, those skilled in the art will recognize that various modifications and improvements may be made to the disclosed subject matter without departing from the scope thereof. Moreover, although individual features of one embodiment of the disclosed subject matter may be discussed herein or shown in the drawings of the one embodiment and not in other embodiments, it should be apparent that individual features of one embodiment may be combined with one or more features of another embodiment or features from a plurality of embodiments.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

What is claimed is:

1. An oscillator assembly, the assembly comprising:
a stator;
a rotor configured to move with one degree of freedom relative to the stator, the rotor further comprising:
at least one rotor magnet disposed on the rotor, wherein the at least one rotor magnet is configured to move with the rotor between a first terminal point and a second terminal point;
a counter-rotating mass (CRM) rotatably and elastically mounted on the stator, wherein the rotor is rotatably mounted on the CRM, the CRM configured to move with one degree of freedom relative to the stator and the rotor, the CRM further comprising:
at least a first energy conversion element (ECE) disposed on the CRM, wherein the first ECE is configured to transfer torque from the rotor to the CRM, thereby causing rotation of the CRM; and
at least a second ECE disposed on the CRM, wherein the second ECE is configured to transfer torque from the rotor to the CRM, thereby causing rotation of the CRM.

2. The assembly of claim 1, wherein the assembly further comprises at least a second rotor magnet disposed on the rotor, wherein the second rotor magnet is configured to move with the rotor between a third terminal point and a fourth terminal point.

3. The assembly of claim 2, wherein the CRM further comprises at least a third and a fourth energy conversion elements (ECEs) disposed thereon, the third ECE configured to transfer torque from the rotor to the CRM, thereby causing rotation of the CRM, and the fourth ECE configured to transfer torque from the rotor to the CRM, thereby causing rotation of the CRM.

4. The assembly of claim 1, wherein each of the at least first and second ECE comprises a spring, the spring configured to transfer torque from the rotor to the CRM.

5. The assembly of claim 1, wherein each of the at least first and second energy conversion elements comprises a magnet.

6. The assembly of claim 5, wherein the at least one rotor magnet is magnetically coupled to each of the at least first and second ECEs, the at least one rotor magnet generating a magnetic field that repels each of the magnets of the first and second ECEs, thereby causing the at least first and second ECEs to move the CRM.

7. The assembly of claim 1, wherein the CRM is configured to rotationally oscillate relative to the stator.

8. The assembly of claim 1, wherein the CRM is elastically mounted on the stator by at least one bearing.

9. The assembly of claim 8, wherein the at least one bearing is a flexure.

10. The assembly of claim 1, wherein each rotor magnet comprises a permanent magnet.

11. The assembly of claim 1, wherein the rotor and the CRM each have a moment of inertia, and wherein the moment of inertia of the CRM is at least 180 times greater than the moment of inertia of the rotor.

12. The assembly of claim 1, wherein the rotor is coupled to a payload.

13. The assembly of claim 12, wherein the payload is a light deflector.

14. A system comprising:
the oscillator assembly of claim 1; and
an actuator coupled to the rotor, the actuator configured to move the rotor.

15. The system of claim 14, wherein the actuator is an electric motor.

16. The system of claim 15, wherein the electric motor is a voice-coil motor.

17. The system of claim 14, wherein the actuator comprises at least one coil positioned within the stator and external to a path travelled by each of the rotor magnets, wherein the at least one coil is electromagnetically coupled to the at least one rotor magnet and is configured to, upon energizing, generate a magnetic field that causes the rotor to move.

18. The system of claim 14, wherein the system further comprises a controller configured to receive a feedback signal and provide a control signal to the actuator to thereby control a velocity of the rotor.

19. A method of oscillating a rotor at a resonant frequency, the method comprising:
providing the system of claim 14, wherein the assembly is an oscillator comprising a resonant frequency, and wherein the actuator is configured to drive motion of the rotor at the resonant frequency and wherein the counter rotating mass is configured to oscillate in response to the oscillation of the rotor; and
energizing the actuator, thereby causing the rotor and the counter rotating mass to oscillate between the first and second terminal points at the resonant frequency.

20. The method of claim 19, wherein the system further comprises a controller, wherein the method further comprises receiving a feedback signal at the controller; and
providing a control signal to the actuator to thereby control a velocity of the rotor.

21. An oscillatory assembly, comprising:
a stator;
a rotor configured to move with one degree of freedom relative to the stator;
a counter-rotating mass (CRM) elastically and rotatably mounted on the stator, wherein the rotor is rotatably mounted on the CRM, the CRM configured to rotationally oscillate relative to the stator and to rotate with one degree of freedom relative to the stator and the rotor, and further wherein:
the rotor comprises at least a first rotor magnet and a second rotor magnet, each mounted on the rotor, the first rotor magnet configured to move with the rotor between a first terminal point and a second terminal point, the second rotor magnet configured to move with the rotor between a third terminal point and a fourth terminal point;
the CRM comprises at least a first, a second, a third and a fourth torque transfer magnets disposed on the CRM proximal to the first, second, third, and fourth terminal points of the rotor, respectively, each torque transfer magnet generating a magnetic field configured to repel the rotor magnets;
the first rotor magnet is magnetically coupled to the first and second torque transfer magnets, and the second rotor magnet is magnetically coupled to the third and fourth torque transfer magnets, the first rotor magnet generating a magnetic field that causes the first and second torque transfer magnets to move the CRM, and the second rotor magnet generating a magnetic field that causes the third and the fourth torque transfer magnets to move the CRM; and further wherein:
the stator comprises at least one coil positioned external to a path travelled by each of the rotor magnets, wherein the at least one coil is electromagnetically coupled to the rotor magnets and is configured to, upon energizing, generate a magnetic field that causes the rotor to move.

22. The oscillatory assembly of claim 21, wherein the rotor and the CRM each have a moment of inertia, and wherein the moment of inertia of the CRM is at least 180 times greater than the moment of inertia of the rotor.

23. The oscillatory assembly of claim 21, wherein the CRM further comprises a first terminus, a second terminus, and a central portion disposed between the first and the second termini, the central portion having a cutout therethrough, wherein the rotor is disposed within the cutout, the rotor and the CRM being coaxially disposed.

24. The oscillatory assembly of claim 21, wherein the CRM is elastically mounted on the stator by at least one flexure.

25. The oscillatory assembly of claim 24, wherein the CRM is elastically mounted on the stator by four flexures.

26. A LIDAR scanning system, comprising:
a light source configured to generate at least one light beam;
an oscillator assembly, the assembly comprising:
a stator;
a rotor configured to move with one degree of freedom relative to the stator, the rotor further comprising:
at least one rotor magnet disposed on the rotor, wherein the at least one rotor magnet is configured to move with the rotor between a first terminal point and a second terminal point;
a counter-rotating mass (CRM) rotatably and elastically mounted on the stator, wherein the rotor is rotatably mounted on the CRM, the CRM configured to move with one degree of freedom relative to the stator and the rotor, the CRM further comprising:

at least a first energy conversion element (ECE) disposed on the CRM, wherein the first ECE is configured to transfer torque from the rotor to the CRM, thereby causing rotation of the CRM; and at least a second ECE disposed on the CRM, wherein the second ECE is configured to transfer torque from the rotor to the CRM, thereby causing rotation of the CRM;

a light deflector coupled to the rotor;

a first actuator coupled to the rotor, the first actuator configured to rotate the light deflector about a first scan axis;

a second actuator configured to rotate the light deflector about a second scan axis, the light deflector configured to deflect the at least one light beam to a field of view (FOV);

at least one processor configured to control the light source, the first actuator and the second actuator to cause the light deflector to scan the FOV.

27. The LIDAR scanning system of claim 26, further comprising at least one sensor configured to detect the at least one light beam reflected from an object located in the field of view, and wherein the at least one processor is configured to:

receive, from the at least one sensor, a reflection signal indicative of the at least one light beam reflected from the object; and based on the reflection signal, generate a point-cloud representation of an environment of the system within the at least a portion of the field of view.

28. The LIDAR scanning system of claim 26, wherein the first scanning axis and the second scanning axis are perpendicular to each other.

29. The LIDAR scanning system of claim 26, wherein the assembly further comprises at least a second rotor magnet disposed on the rotor, wherein the second rotor magnet is configured to move with the rotor between a third terminal point and a fourth terminal point.

30. The LIDAR scanning system of claim 29, wherein the CRM further comprises at least a third and a fourth energy conversion elements (ECEs) disposed thereon, the third ECE configured to transfer torque from the rotor to the CRM, thereby causing rotation of the CRM, and the fourth ECE configured to transfer torque from the rotor to the CRM, thereby causing rotation of the CRM.

31. The LIDAR scanning system of claim 26, wherein each of the at least first and second ECE comprises a spring, the spring configured to transfer torque from the rotor to the CRM.

32. The LIDAR scanning system of claim 26, wherein each of the at least first and second energy conversion elements comprises a magnet.

33. The LIDAR scanning system of claim 32, wherein the at least one rotor magnet is magnetically coupled to each of the at least first and second ECEs, the at least one rotor magnet generating a magnetic field that repels each of the magnets of the first and second ECEs, thereby causing the at least first and second ECEs to move the CRM.

34. The LIDAR scanning system of claim 26, wherein the CRM is configured to rotationally oscillate relative to the stator.

35. The LIDAR scanning system of claim 26, wherein the CRM is elastically mounted on the stator by at least one bearing.

36. The LIDAR scanning system of claim 35, wherein the at least one bearing is a flexure.

37. The LIDAR scanning system of claim 26, wherein each rotor magnet comprises a permanent magnet.

38. The LIDAR scanning system of claim 26, wherein the rotor and the CRM each have a moment of inertia, and wherein the moment of inertia of the CRM is at least 180 times greater than the moment of inertia of the rotor.

39. The system of claim 26, wherein the first and/or the second actuator is an electric motor.

40. The system of claim 39, wherein the electric motor is a voice-coil motor.

41. The system of claim 26, wherein the first actuator comprises at least one coil positioned within the stator and external to a path travelled by each of the rotor magnets, wherein the at least one coil is electromagnetically coupled to the at least one rotor magnet and is configured to, upon energizing, generate a magnetic field that causes the rotor to move.

42. The system of claim 26, wherein the system further comprises a controller configured to receive a feedback signal and provide a control signal to the first actuator to thereby control a velocity of the rotor.

\* \* \* \* \*